(12) United States Patent
Hosoya et al.

(10) Patent No.: US 7,763,386 B2
(45) Date of Patent: *Jul. 27, 2010

(54) CATHODE ACTIVE MATERIAL AND NON-AQUEOUS ELECTROLYTE SECONDARY CELL USING SAME

(75) Inventors: Yosuke Hosoya, Fukushima (JP);
Yoshikatsu Yamamoto, Fukushima (JP);
Takashi Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 862 days.

This patent is subject to a terminal disclaimer.

(21) Appl. No.: 10/468,900

(22) PCT Filed: Jan. 8, 2003

(86) PCT No.: PCT/JP03/00065

§ 371 (c)(1),
(2), (4) Date: Aug. 26, 2003

(87) PCT Pub. No.: WO03/063275

PCT Pub. Date: Jul. 31, 2003

(65) Prior Publication Data

US 2004/0076882 A1    Apr. 22, 2004

(30) Foreign Application Priority Data

Jan. 8, 2002  (JP) .............. 2002-001724
Oct. 10, 2002  (JP) .............. 2002-296962
Oct. 18, 2002  (JP) .............. 2002-303684

(51) Int. Cl.
*H01M 4/58* (2010.01)
*H01M 4/00* (2010.01)
*H01M 4/88* (2010.01)

(52) U.S. Cl. .............. 429/231.1; 429/231.2; 429/231.3; 429/231.95; 429/223; 429/224; 252/182.1

(58) Field of Classification Search .............. 429/231.3, 429/231.1, 231.2, 223, 224, 231.5, 231.6; 252/182.1, 519.1
See application file for complete search history.

(56) References Cited

U.S. PATENT DOCUMENTS

2004/0058244 A1 * 3/2004 Hosoya et al. .......... 429/231.1
2005/0266315 A1 * 12/2005 Sato et al. .............. 429/231.95

FOREIGN PATENT DOCUMENTS

| JP | 7-235292 A1 | 9/1995 |
|---|---|---|
| JP | 11-162466 A1 | 6/1998 |
| JP | 11-86845 A1 | 3/1999 |
| JP | 11-162466 * | 6/1999 |
| JP | 11-219706 | 8/1999 |
| JP | 2000-149923 | 5/2000 |
| JP | 3049727 A | 6/2000 |
| JP | 2000-294240 A | 10/2000 |
| JP | 2000-323122 A | 11/2000 |
| JP | 2001-85006 * | 3/2001 |
| JP | 2001-357851 | 12/2001 |
| JP | 2002-042816 A1 | 2/2002 |
| JP | 2002-42887 | 2/2002 |
| JP | 2002-141063 A1 | 5/2002 |
| JP | 2002-158008 | 5/2002 |
| JP | 2002-184402 A | 6/2002 |
| JP | 2002-208441 A1 | 7/2002 |
| JP | 2002-260634 | 9/2002 |
| JP | 2002-319398 A | 10/2002 |
| JP | 2002-319398 A1 | 10/2002 |
| JP | 2002-343355 | 11/2002 |
| JP | 2002-343355 A1 | 11/2002 |
| JP | 2003-077459 A | 3/2003 |

OTHER PUBLICATIONS

Computer-generated English Translation of Japanese document JP 2001-085006 (Hideyuki et al, Mar. 30, 2001).*
International Search Report, May 13, 2003.
Izumi, Nakai, In site EAFS Measurements of Secondary Lithium Batteries, DENKI KAGAKU, Oct. 1998, vol. 66, No. 10, pp. 968 to 976.
(Part I) Japanese Office Action; Application No. 2002-296962; Dated: Aug. 14, 2007.
(Part II) Japanese Office Action; Application No. 2002-303684; Dated: Aug. 14, 2007.
Japanese Office Action issued Sep. 29, 2009 for corresponding Japanese Application No. 2002-296962.
Japanese Office Action issued Sep. 29, 2009 for corresponding Japanese Application No. 2002-303684.

* cited by examiner

*Primary Examiner*—Raymond Alejandro
(74) *Attorney, Agent, or Firm*—Rader, Fishman & Grauer PLLC

(57) ABSTRACT

A cathode active material having a large capacity and improved charge/discharge cycle characteristics is disclosed. A battery has a cathode (2) having a cathode active material, an anode (3) and a non-aqueous electrolyte, and uses a cathode active material composed of a mixture of a first lithium-transition metal composite oxide containing Ni and Co and comprising a layer structure and a second lithium-transition metal composite oxide containing Ni and Mn and comprising a layer structure.

4 Claims, 17 Drawing Sheets

*Ni-K SHELL ABSORPTION SPECTRUM IN XAFS

* Ni-K SHELL ABSORPTION SPECTRUM IN XAFS

CATHODE ACTIVE MATERIAL AND NON-AQUEOUS ELECTROLYTE SECONDARY CELL USING SAME

TECHNICAL FIELD

The present invention relates to a cathode active material used for a battery and also to a non-aqueous electrolyte secondary battery using the cathode active material.

BACKGROUND ART

In recent years, demand for secondary batteries has been rapidly increasing, because of advent of a large number of portable electronic appliances such as a camera-integrated VTR, a mobile phone and a laptop computer. With a tendency to miniaturization and lightweight of these electronic appliances, the secondary batteries have required a larger energy density intended for use as portable power sources. Among the secondary batteries, a lithium ion secondary battery is expectable in virtue of its energy density larger than that of conventional aqueous electrolyte secondary batteries such as a lead battery and a nickel-cadmium battery.

The lithium ion secondary battery practically uses, for a cathode active material, a lithium-cobalt composite oxide comprising a layer structure, a lithium-manganese composite oxide having a spinel structure, a lithium-nickel composite oxide or the like.

(1) The lithium-manganese composite oxide having the spinel structure exhibits a stabled crystal structure, whereas there are problems that a charge capacity of the lithium-manganese composite oxide is lower than that of the lithium-cobalt oxide or the lithium-nickel oxide, and a high temperature storage characteristic thereof is also somewhat inferior thereto.

(2) The lithium-nickel composite oxide is expectable in virtue of excellence in material cost and stabilization of supplying superior to the lithium-cobalt composite oxide. However, there are problems that the lithium-nickel composite oxide has a crystal structure of low stability, and thereby causes lowering of charge/discharge capacity and energy density and/or degradation of charge/discharge cycle characteristics under high temperature environment.

As for methods for achieving stability of the crystal structure of the lithium-nickel composite oxide to suppress lowering of charge/discharge capacity and energy density, there are, for instance, proposals for methods such as one of upgrading cycle characteristics by substitution of a part of nickel with a different species of element as described in Japanese Patent Laid-open Nos. Hei 5-283076 and Hei 8-37007, one of using a specific metal salt or the like for an additive as described in Japanese Patent Laid-open No. Hei 7-192721 and one of regulating a binder in a process of synthesis of a cathode as described in Japanese Patent Laid-open No. Hei 10-302768. However, it is still necessary for the lithium-nickel composite oxide to have a more stabled crystal structure to meet recent requirements for larger density of electronic appliances or the like and higher speed of integrated circuits or the like, or environmental resistance required for mobile appliances or the like.

There is also a proposal for a method of adding, to the lithium-nickel composite oxide, the spinel-type lithium-manganese composite oxide whose crystal structure is stable. However, this method is disadvantageous in that the spinel-type lithium-manganese composite oxide has low charge capacity, and thereby causes lowering of charge/discharge capacity of a cathode without exploiting large capacity of the lithium-nickel composite oxide.

(3) The lithium-cobalt composite oxide is widely used, because cost and physical properties such as charge capacity and thermal stability are best balanced. However, the lithium-cobalt composite oxide has problems in cost and stabilization of supplying due to a small output of cobalt.

In the lithium-cobalt composite oxide being charged/discharged ranging from 4.250 V to 3.00 V to lithium metal results in a mean discharge voltage of 3.9 V to 4.0 V or around. Thus, an over-discharge state of a lithium ion battery with a cathode composed of the lithium-cobalt composite oxide increases a potential of an anode, and thereby causes problems such as dissolution of copper foil used for a current collector so as to exert a bad influence such as lowering of capacity upon the battery when the battery was recharged. Thus, the above lithium ion battery employs an external element such as a protection circuit to regulate a voltage in a final stage of discharge, and this constitution has been obstacles to miniaturization and cost reduction of the above lithium ion battery.

The present invention is conceived in view of the above conventional situations, and is to provide a cathode active material having large charge/discharge capacity and increased energy density of a cathode, and besides, being capable of achieving excellent charge/discharge cycle characteristics not only at room temperature but also under high temperature environment, and also to provide a non-aqueous electrolyte battery using the cathode active material.

In a lithium ion battery with a cathode composed of a lithium-cobalt composite oxide, the present invention is also to provide a cathode active material capable of realizing a lithium ion non-aqueous electrolyte secondary battery, which has a large capacity and is excellent in over-discharge resistance, and also to provide a lithium ion non-aqueous electrolyte secondary battery using the cathode active material.

DISCLOSURE OF THE INVENTION

A first aspect of the present invention is characterized in that a cathode active material is composed of a mixture of a first cathode material containing at least Ni and Co and comprising a layer structure and a second cathode material containing at least Ni and Mn and comprising a layer structure.

In the above cathode active material, the first cathode material containing at least Ni and Co and comprising the layer structure and the second cathode material containing at least Ni and Mn and comprising the layer structure are mixed, and the first cathode material has a large capacity, while the second cathode material exhibits a stabled crystal structure, resulting in achievement of larger charge/discharge capacity, improved energy density and excellent charge/discharge cycle characteristics even under high temperature environment.

A non-aqueous electrolyte secondary battery of the present invention comprises a cathode configured so that a cathode current collector is coated with a cathode active material compound layer containing a cathode active material, an anode configured so that an anode current collector is coated with an anode active material compound layer containing an anode active material, and a non-aqueous electrolyte. The non-aqueous electrolyte secondary battery is characterized in that the cathode active material is composed of a mixture of a first cathode material containing at least Ni and Co and having a layer structure and a second cathode material containing at least Ni and Mn and having a layer structure.

In the above non-aqueous electrolyte secondary battery, the cathode active material composed of the mixture of the first cathode material containing at least Ni and Co and having the layer structure and the second cathode material containing at least Ni and Mn and having the layer structure is used, and the first cathode material has a large capacity, while the second cathode material exhibits a stabled crystal structure, resulting in achievement of larger charge/discharge capacity, improved energy density and excellent charge/discharge cycle characteristics even under high temperature environment.

In addition, a second aspect of the present invention is characterized in that the cathode active material used for a lithium ion non-aqueous electrolyte secondary battery is a cathode active material containing a lithium-nickel composite oxide having a layer structure and in which a shift width of 50% position (a half of the whole lithium contents) of jump height of nickel-K shell absorption edge obtained by measurement using an XAFS (X-ray Absorption Fine Structure analysis) technology is equal to or more than 1.0 eV.

The lithium ion non-aqueous electrolyte secondary battery of the present invention is a secondary battery comprising a cathode consisting of a cathode active material composed of a material capable of inserting and extracting lithium ion, an anode consisting of an anode active material composed of a material capable of inserting and extracting lithium ion, and a non-aqueous electrolyte prepared by dispersing an electrolyte in a non-aqueous medium, wherein the cathode active material is a cathode active material containing a lithium composite oxide in which a shift width of 50% position of jump height of nickel-K shell absorption edge obtainable by measurement using the XAFS technology is equal to or more than 1.0 eV when 50% of the whole lithium contents was extracted.

A third aspect of the present invention is characterized in that the cathode active material is a cathode active material preferably used for a lithium ion non-aqueous electrolyte secondary battery and composed of a first lithium-transition metal composite oxide mainly containing lithium and cobalt and having a layer structure and a second lithium-transition metal composite oxide having a layer structure and whose mean discharge voltage resulting from discharge down to a range of 4.25 V to 3.00 V under a current of 0.2 C is lower than that of the first composite oxide by 0.05 V or more.

In such a cathode active material, the lithium-transition metal composite oxide whose mean discharge voltage is lower than that of the lithium-cobalt composite oxide by 0.05 V or more is added to the lithium-cobalt composite oxide and is used for the cathode active material, resulting in a cathode potential lowered in a final stage of discharge so as to substantially improve resistance to over-discharge.

Further, the lithium ion non-aqueous electrolyte secondary battery of the present invention is a secondary battery comprising a cathode consisting of a cathode active material composed of a material capable of inserting and extracting lithium ion, an anode consisting of an anode active material composed of a material capable of inserting and extracting lithium ion similarly, and a non-aqueous electrolyte having lithium ion conductivity, wherein the cathode active material used is the above cathode active material, specifically, the cathode active material composed of the first lithium-transition metal composite oxide mainly containing lithium and cobalt and the second lithium-transition metal composite oxide whose mean discharge voltage is lower than that of the first composite oxide by 0.05 V or more.

BEST MODE FOR CARRYING OUT THE INVENTION

A cathode active material according to an embodiment of the present invention and a non-aqueous electrolyte secondary battery using the cathode active material will now be described in detail with reference to the accompanying drawings.

Figure 1:
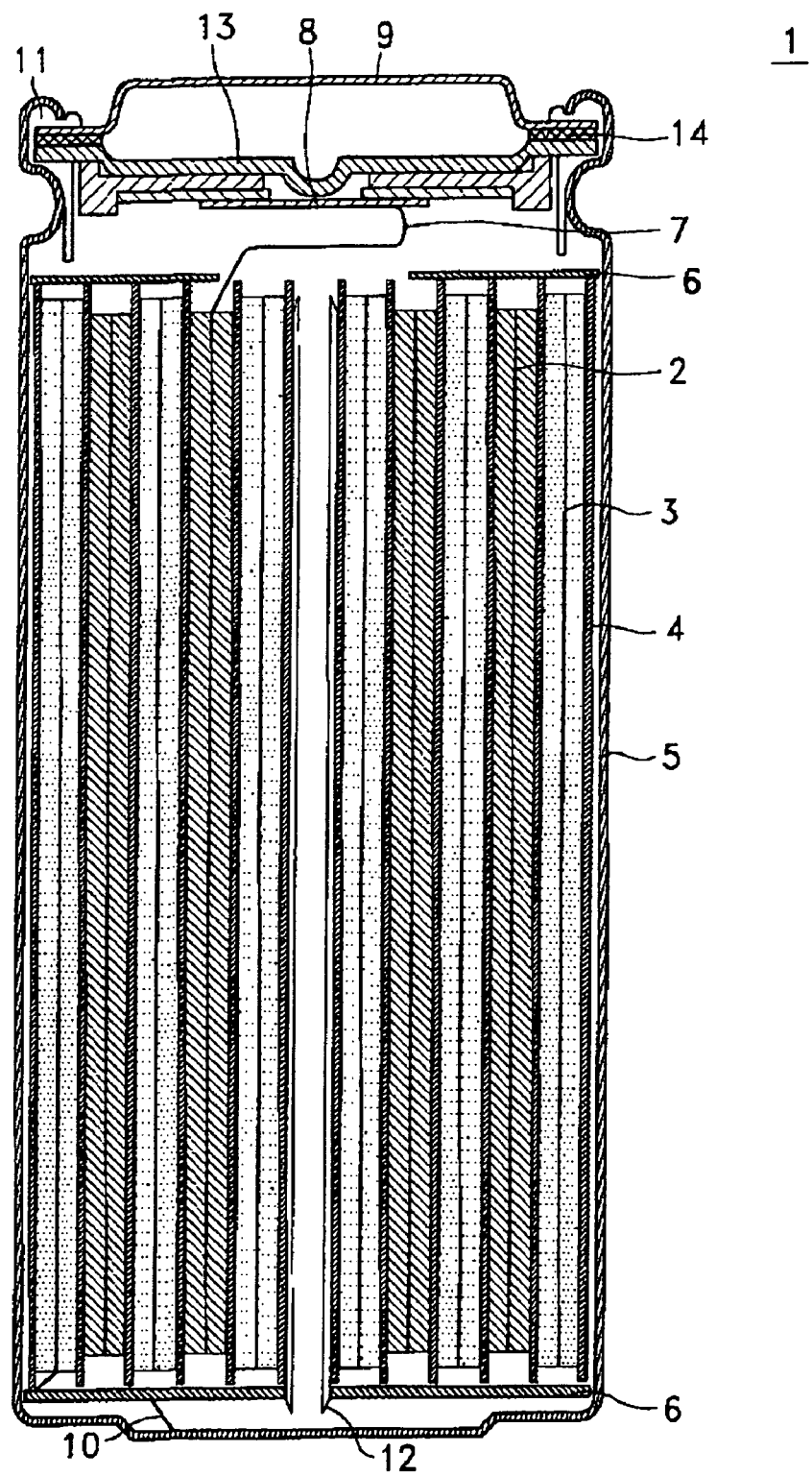
FIG. 1 is a longitudinal sectional view showing a non-aqueous electrolyte secondary battery according to the present invention.

As shown in FIG. 1, a non-aqueous electrolyte secondary battery 1 is configured so that an electrode member obtained by spirally winding up a long strip-shaped cathode 2 and a long strip-shaped anode 3 in a close contact manner while placing a separator 4 in between is housed in a battery container 5.

The cathode 2 is obtained by coating a cathode current collector with a cathode compound material composed of a cathode active material, a binder and a conductive material in a layered form. For the binder, thermoplastic resins such as polytetrafluoroethylene, polyvinylidene fluoride and polyethylene are available. For the conductive material, artificial graphites and carbon blacks or the like are available. Specifically, the cathode current collector is composed of metal foil such as aluminum foil.

The cathode active material is composed of a mixture of a first cathode material and a second cathode material.

According to a first aspect of the present invention, the cathode active material is composed of a mixture of the first cathode material containing at least Ni and Co and having a layer structure and the second cathode material containing at least Ni and Mn and having a layer structure.

The first cathode material is a first lithium-transition metal composite oxide having a layer structure and being expressed by a following chemical formula (1).

$$Li_xNi_{1-y-z}Co_yM_zO_2 \quad (1)$$

where M is any one or more transition metals or elements selected from Group 2, 3 and 4 elements of a long form of the periodic table, and x, y and z satisfy $0.90 \leq x < 1.1$, $0.05 \leq y \leq 0.50$ and $0.01 \leq z \leq 0.10$, respectively.

M in the above chemical formula (1) specifically represents an element or elements homogeneously dispersible in grains of the first lithium-transition metal composite oxide. More preferably, M is any one or more elements selected from Fe, Co, Zn, Al, Sn, Cr, V, Ti, Mg and Ga.

The second cathode material is a second lithium-transition metal composite oxide having a layer structure and being expressed by a following chemical formula (2).

$$Li_sNi_{1-t-u}Mn_tM'_uO_2 \quad (2)$$

where M' is any one or more transition metals or elements selected from Group 2, 3 and 4 elements of the long form of the periodic table, and s, t and u satisfy $0.90 \leq s < 1.1$, $0.05 \leq t \leq 0.50$ and $0.01 \leq u \leq 0.30$, respectively.

M' in the above chemical formula (2) specifically represents an element or elements homogeneously dispersible in grains of the second lithium-transition metal composite oxide. More preferably, M' is any one or more elements selected from Fe, Co, Zn, Al, Sn, Cr, V, Ti, Mg and Ga.

The first lithium-transition metal composite oxide and the second lithium-transition metal composite oxide are contained preferably in a mixing ratio of 15% by weight or more to 85% by weight or less, more preferably, 30% by weight or more to 70% by weight or less to the whole cathode active material. In the cathode active material, a decrease to less than 15% by weight of the first lithium-transition metal composite oxide in mixing ratio means an increase to more than 85% of the second lithium-transition metal composite oxide in mixing ratio, also increases a proportion of the low-capacity second lithium-transition metal composite oxide to the whole cathode active material, and thereby causes lowering of initial capacity of the cathode active material without exploiting a large capacity of the first lithium-transition metal composite oxide. On the contrary, an increase to more than 85% by weight of the first lithium-transition metal composite oxide in mixing ratio means a decrease to less than 15% of the second lithium-transition metal composite oxide in mixing ratio, also renders a crystal structure of the cathode active material unstable, and thereby promotes deterioration of the crystal structure under repetitive charge/discharge cycles so as to cause remarkable degradation of charge/discharge cycle capacity retention ratio under high temperature environment.

Thus, in the cathode active material, mixing in a first lithium-transition metal composite oxide-to-second lithium-transition metal composite oxide ratio of 15% by weight or more to 85% by weight or less allows the first lithium-transition metal composite oxide and the second lithium-transition metal composite oxide to offset a change of charge/discharge capacity and a change of crystal structure in response to charge/discharge, thereby minimizes the change of crystal structure, and consequently achieves improved charge/discharge cycle capacity retention ratio.

In the cathode active material, the first lithium-transition metal composite oxide and the second lithium-transition metal composite oxide are preferably adjusted to have a mean particle size of 30 μm or less, more preferably, from 2 μm or more to 30 μm or less. In the cathode active material, a decrease to less than 2 μm of the mean particle size of the first lithium-transition metal composite oxide and the second lithium-transition metal composite oxide increases a contact area between the cathode active material and the electrolyte, and thereby promotes decomposition of an electrolyte solution so as to cause degradation of characteristics under high temperature environment. On the contrary, an increase to more than 30 μm of the mean particle size of the first lithium-transition metal composite oxide and the second lithium-transition metal composite oxide makes it difficult to sufficiently mix the first lithium-transition metal composite oxide and the second lithium-transition metal composite oxide, and thereby causes lowering of initial capacity and/or degradation of charge/discharge cycle capacity retention ratio under high temperature environment.

Thus, in the cathode active material, adjusting the mean particle size of the first lithium-transition metal composite oxide and the second lithium-transition metal composite oxide to 30 μm or less minimizes the contact area between the cathode active material and the electrolyte solution, also makes it possible to sufficiently mix the first lithium-transition metal composite oxide and the second lithium-transition metal composite oxide, and thereby achieves larger initial capacity and improved charge/discharge cycle capacity retention ratio under high temperature environment.

In the cathode active material, Co parts in the first lithium-transition metal composite oxide and Mn parts in the second lithium-transition metal composite oxide are preferably adjusted to a range of 0.05 or more to 0.50 or less. In the cathode active material, adjusting Co parts and Mn parts to less than 0.05 renders the crystal structures of the first lithium-transition metal composite oxide and the second lithium-transition metal composite oxide unstable, and thereby deteriorates the crystal structure of the cathode active material under repetitive charge/discharge cycles so as to cause degradation of charge/discharge cycle characteristics. On the contrary, adjusting the Co parts and Mn parts to more than 0.5 allows the cathode active material to form a crystal structure that brings about lowering of charge/discharge capacity, and thereby causes lowering of charge/discharge capacity.

Thus, in the cathode active material, adjusting the Co parts in the first lithium-transition metal composite oxide and Mn parts in the second lithium-transition metal composite oxide to a range of 0.05 or more to 0.50 or less suppresses deterioration of the crystal structure, and thereby achieves improved charge/discharge cycle characteristics. Also, adjusting the Co parts and Mn parts to the range of 0.05 or more to 0.50 or less allows the cathode active material to form a large-capacity crystal structure, and thereby achieves larger charge/discharge capacity.

The first lithium-transition metal composite oxide and the second lithium-transition metal composite oxide are prepared by mixing carbonates of lithium, nickel, cobalt, manganese or the like according to each composition, and by sintering a mixture of carbonates in an air or oxygen atmosphere at temperatures ranging from 600° C. to 1100° C. It is noted that a starting material is by no means limited to carbonates, and other starting materials such as hydroxides, oxides, nitrates and organic acid-bases are also available likewise. Alternatively, composite hydroxides and/or composite carbonates containing lithium, nickel, cobalt and manganese are also available as materials for the first lithium-transition metal composite oxide and the second lithium-transition metal composite oxide.

The above cathode active material is composed of the mixture of the large-capacity first lithium-transition metal composite oxide and the second lithium-transition metal composite oxide having the stable crystal structure, and thereby achieves larger charge/discharge capacity and stabilization of crystal structure. Thus, the cathode active material is successful in achieving larger charge/discharge capacity, larger energy density and improved charge/discharge cycle capacity retention ratio under high temperature environment. The cathode active material also achieves larger initial capacity and more excellent charge/discharge cycle capacity retention ratio by regulating the mixing ratio of the first lithium-transition metal composite oxide to the second lithium-transition metal composite oxide, the average grain size of the first lithium-transition metal composite oxide and the second lithium-transition metal composite oxide, Co parts in the first lithium-transition metal composite oxide and Mn parts in the second lithium-transition metal composite oxide or the presence or absence of additive elements in the first lithium-transition metal composite oxide and the second lithium-transition metal composite oxide as described above.

The anode 3 is obtained by coating an anode current collector with an anode compound material composed of an anode active material and a binder. For the anode active material, materials capable of inserting and extracting lithium to electrochemically under a potential of 2.0 V or less to lithium metal are used. Examples of available materials include carbonaceous materials such as non-graphitizable carbon, artificial graphite, naturally occurred graphite, pyrolytic carbons, cokes (pitch coke, needle coke, petroleum coke and others), graphites, vitreous carbons (glass-like carbons), sintered organic polymer compounds (carbonized organic polymer compounds obtained by sintering phenol resin, furan resin or the like at appropriate temperatures), fibrous carbon, activated carbon and carbon blacks.

Alternatively, metals capable of alloying with lithium and alloyed compounds consisting of the metals capable of alloying with lithium are also available as materials for the anode active material. Examples of metals capable of alloying with lithium include Mg, B, Al, Ga, In, Si, Sn, Pb, Sb, Bi, Cd, Ag, Zn, Hf, Zr and Y, on an assumption that semiconductor elements are also included. Alternatively, oxides such as ruthenium oxide, molybdenum oxide, tungsten oxide, titanium oxide, tin oxide or those ensuring a relatively low potential and also inserting and extracting lithium ion and other nitrides are also available likewise. For the anode current collector, metal such as copper foil is used. For the conductive material, similar materials inclusive of carbonaceous materials such as artificial graphite and carbon black and metals in a powdered form to those for the conductive material used in fabricating the cathode 2 are used.

Fabrication of the cathode 2 and the anode 3 is carried out using any one of methods such as one of coating mixtures prepared by adding a binder, a conductive material or the like to the cathode active material and the anode active material and by also adding a solvent thereto, one of coating mixtures prepared by adding a binder or the like to the cathode active material and the anode active material and by heating the mixtures, and one of forming a molded electrode member by subjecting the cathode active material and the anode active material individually or mixtures thereof added with a conductive material or mixtures thereof further added with the binder to treatment such as molding. However, fabrication of the cathode 2 and the anode 3 is by no means limited to the above methods.

In fabrication of the cathode 2, for instance, to the cathode active material prepared by mixing the first lithium-transition metal composite oxide and the second lithium-transition metal composite oxide is added the above conductive material and the above binder in a predetermined ratio to prepare a cathode compound material, and the cathode compound material is further dispersed in an organic solvent such as N-methyl-2-pyrolidone to obtain a cathode compound material in a slurry form. Next, the slurry-formed cathode compound material is uniformly coated on the cathode current collector to form a cathode active material compound layer, then dried and subjected to molding to thereby obtain the cathode 2.

In fabrication of the anode 3, the anode active material and the binder are mixed in a predetermined ratio to obtain an anode compound material in a slurry form. Next, the slurry-formed anode compound material is uniformly coated on the anode current collector to form an anode active material compound layer, then dried and subjected to molding to thereby obtain the anode 3. In fabrication of the cathode 2 and the anode 3, it is also allowable to obtain a reinforced cathode 2 and a reinforced anode 3 by subjecting the cathode active material and the anode active material with heat being applied thereto to pressure molding, no matter whether the binder is used or not.

Manufacture of the non-aqueous electrolyte secondary battery 1 using the cathode 2 and the anode 3 is carried out using any one of methods such as one of spirally winding up the cathode 2 and the anode 3 around a core while placing a separator 4 in between and one of stacking the cathode 2 and the anode 3 while placing the separator 4 in between.

The electrolyte may be any one of a non-aqueous electrolyte solution prepared by dissolving an electrolyte salt in a non-aqueous solvent, a solid electrolyte containing an electrolyte salt and a gel electrolyte prepared by impregnating a non-aqueous electrolyte solution consisting of a non-aqueous solvent and an electrolyte salt into a matrix polymer.

The non-aqueous electrolyte solution is prepared by properly combining an organic solvent and an electrolyte salt. The organic solvent may be any of those used for batteries using a non-aqueous electrolyte solution system. Examples of the organic solvent include propylene carbonate, ethylene carbonate, vinylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetic acid ester, lactic acid ester and propionic acid ester. The electrolyte salts may be any of those used for batteries using a non-aqueous electrolyte solution system, and examples of which include LiCl, LiBr, $LiClO_4$, $LiAsF_6$, $LiPF_6$, $LiBF_4$, $LiCH_3SO_3$, $LiCF_3SO_3$, $Li(CF_3SO_2)_2$, $LiB(C_6H_5)_4$ and $LiN(C_nF_{2n+1}SO_2)_2$ or the like.

The solid electrolyte may be any of an inorganic solid electrolyte and a polymer solid electrolyte provided that these electrolytes have lithium ion conductivity. Examples of the inorganic solid electrolyte include lithium nitride and lithium iodide or the like. The polymer solid electrolyte consists of a polymer compound containing any of the above-described electrolyte salts. For the polymer compound, ether polymers such as polyethylene oxide and cross-linked products thereof and ester polymers such as polymethacrylate and polyacrylate are available, for instance.

The matrix polymer for the gel electrolyte may be any species of organic polymers that may be gelated after absorbing the non-aqueous electrolyte solution. Examples of the matrix polymer include fluorine-containing polymers such as polyvinylidene fluoride and polyvinylidene fluoride-co-hexafluoro propylene, ether polymers such as polyethylene oxide and cross-linked products thereof and polyacrylonitrile or the like. In particular, for the matrix polymer for the gel electrolyte, it is preferable to use a fluorine-containing polymer in virtue of its redox stability.

In particular, it is preferable to use a fluorine-containing polymer material so as to meet redox stability. An appropriate molecular weight of the polymer ranges from 300,000 to 800,000 or around.

Specifically, dispersion of the electrolyte into the polymer may be typically accomplished by dissolving a polymer such as polyvinylidene fluoride into a non-aqueous electrolyte solution prepared by dissolving an electrolyte into a non-aqueous solvent so as to obtain a sol polymer.

As described above, the matrix for the gel electrolyte is given with ion conductivity by containing the electrolyte salt in the non-aqueous electrolyte solution.

Furthermore, the solid electrolyte may be either of an inorganic solid electrolyte and a polymer solid electrolyte provided that these electrolytes have lithium ion conductivity. Examples of the inorganic solid electrolyte include crystalline solid electrolytes such as lithium nitride and lithium iodide and amorphous solid electrolytes such as lithium ion conductive glass inclusive of $LiI.Li_2S.P_2S_6$ system glass and $LiI.Li_2S.B_2S_6$ system glass.

In addition, the polymer solid electrolyte consists of an electrolyte salt and a polymer compound that is to dissolve the electrolyte salt. For the polymer compound, ether polymers such as polyethylene oxide and cross-linked products thereof and ester polymers such as polymethacrylate and polyacrylate are available.

While the non-aqueous electrolyte secondary battery of the present invention is typically configured so that the above spirally wound electrode and the non-aqueous electrolyte are enclosed in a metal or plastic-made case or the like, it is preferable to enclose the spirally wound electrode and the non-aqueous electrolyte in a film-formed external case so as to meet requirements for lightweight and small thickness. Available materials for a laminated film forming the film-formed external case include plastic materials such as polyethylene terephthalate (PFT), molten polypropylene (PP), cast polypropylene (CPP), polyethylene (PE), low density polyethylene (LDPE), high density polyethylene (HDPE), linear chain-formed low density polyethylene (LLDPE) and polyamide-containing synthetic polymer materials (trade name:Nylon:Ny), and aluminum (Al) is used as an impermeable barrier film.

The most typical constitution of the laminated film may be exemplified by an external layer/metal layer (barrier film)/sealant layer constitution obtained by a combination of PET/Al/PE. Alternatively, the laminated film constitution is by no means limited to the above combination, and any other combinations of Ny/Al/CPP, PET/Al/CPP, PET/Al/PET/CPP, PET/Ny/Al/CPP, PET/Ny/Al/Ny/CPP, PET/Ny/Al/Ny/PE, Ny/PE/Al/LLDPE, PET/PE/Al/PET/LDPE and PET/Ny/Al/LDPE/CPP are also applicable to the external layer/metal film/sealant layer constitution. It is a matter of course that any of metals other than Al is also available for the metal film.

While the lithium ion non-aqueous electrolyte secondary battery of the present invention comprises, as indispensable components, the cathode containing the cathode active material of the present invention, the anode and the non-aqueous electrolyte, a form of the battery is by no means limited in particular, and the battery may have a variety of forms such as a cylinder, a square, a coin, a button, a laminated seal or the like. In order to obtain a more secure enclosed-type non-aqueous electrolyte secondary battery, the lithium ion non-aqueous electrolyte secondary battery further comprising a means such as a safety valve that is operated in response to an increase of pressure inside the battery so as to interrupt a current at the time of abnormal conditions such as overcharge is preferably required.

The non-aqueous electrolyte secondary battery of the present invention is configured with various materials described above, particularly, the specific cathode active material, and thus provided as that having large capacity and being excellent in over-discharge resistance.

In manufacture of a cylindrical non-aqueous electrolyte secondary batter 1, firstly, thus-fabricated cathode 2 and anode 3 are spirally wound up a large number of times while placing a separator 4 made of a porous polyolefin film in between to obtain a spirally wound electrode member. The spirally wound electrode member is enclosed, with insulator plates 6 mounted on both upper and lower faces of the electrode member, in a battery container 5 made of nickel-plated iron. Current collection of the cathode 2 is obtained by extracting one end of a cathode lead 7 made of aluminum from the cathode current collector, while welding the other end to a current interrupt thin plate 8 to establish electrical connection with a battery cap 9. Current collection of the anode 3 is obtained by extracting one end of an anode lead 10 made of nickel from the anode current collector, while welding the other end to a bottom of the battery container 5.

Next, the prepared non-aqueous electrolyte solution is poured into the battery container 5 with the above electrode member incorporated therein, and thereafter, the battery cap 9 is fixed by caulking the battery container 5 through an insulator sealing gasket 11. Specifically, the non-aqueous electrolyte secondary battery 1 has a center pin 12 connected to the cathode lead 7 and the anode lead 10, a safety valve 13 for letting gas out of the non-aqueous electrolyte secondary battery 1 when a pressure inside the non-aqueous electrolyte secondary battery 1 increases more than a predetermined value, and a PTC (Positive Temperature Coefficient) element 14 for preventing a rise of temperature inside the non-aqueous electrolyte secondary battery 1.

Thus-configured non-aqueous electrolyte secondary battery uses, for the cathode active material composing the cathode 2, the mixture of the large-capacity first lithium-transition metal composite oxide and the second lithium-transition metal composite oxide having the stable crystal structure, and thereby achieves larger charge/discharge capacity and stability of crystal structure. Thus, the non-aqueous electrolyte secondary battery 1 is successful in achieving improved charge/discharge cycle capacity retention ratio at room temperature and also under high temperature environment as well as having larger charge/discharge capacity and larger energy density.

The present invention is also effective in being applied to manufacture of a square-shaped non-aqueous electrolyte secondary battery using a winding-up method. In this case, manufacture is carried out in such a manner that an inner diameter of a core is adjusted so as to be in conformity with a diameter of a portion having the greatest curvature in an ellipsoidal core used at the time of a winding-up process in manufacture of the battery.

A second aspect of the present invention is characterized in that the cathode active material for the lithium ion non-aqueous electrolyte secondary battery is a cathode active material containing a lithium-nickel composite oxide having a layer structure and in which a shift width of 50% position (a half of the whole lithium contents) of jump height of nickel-K shell absorption edge obtained by measurement using an XAFS (X-ray Absorption Fine Structure analysis) technology is equal to or more than 1.0 eV.

The cathode active material of the present invention will next be described in detail. It is to be noted that "%" described in this specification represents a mass percentage, unless otherwise specified.

As described above, the cathode active material of the present invention is used for the lithium ion non-aqueous electrolyte secondary battery, and contains a lithium composite oxide having a layer structure and containing at least lithium and nickel as components.

In the above lithium composite oxide, a shift width of 50% position of jump height of nickel-K shell absorption edge obtainable by measurement using the X-ray absorption fine structure analysis (XAFS) technology is equal to or more than 1.0 eV when 50% of the whole lithium contents was extracted. This obtains a cathode active material having a large capacity and also being excellent in resistance when operated under high temperature environment.

Preferably available materials for the lithium-transition metal composite oxide include materials such as $LiNiO_2$ or those having a layer structure, mainly containing nickel and lithium and being capable of allowing lithium to insert thereinto and extract therefrom. Alternatively, known materials per se prepared by substituting a part of components with a different species of element are also available.

The above constitution contributes to improvement of environmental resistance of an oxidation state of nickel ion in the lithium-nickel composite oxide.

The X-ray absorption fine structure (XAFS) analysis will next be described.

It is typically known that elements have the property of absorbing X-rays of specific energy due to electron transition of inner-shell electrons. More specifically, measuring X-ray absorption spectrum on a certain element results in absorption rapidly increased when energy of a certain value or more is reached. This is called an absorption edge. What kind of form the measured element is being or a surrounding environment thereof is reflected by a fine structure in the vicinity of the absorption edge, so that analysis of an electron state or a local structure is carried out using analysis of the fine structure.

Particularly, a structure obtained by subtracting background from the absorption spectrum and by extending a range as much as about several 10 eV in the close vicinity of jump or around of the absorption edge is called X-ray absorption fine structure (XAFS), by which an electron state of a central element is mainly reflected. $LiNiO_2$ also shows that the absorption edge shifts toward a higher energy side in response to charging (DENKI KAGAKU, 66 (1998) 968. and others, for instance).

The present invention is to regulate that the shift width of energy value be equal to or more than 1.0 eV between an initial state and a state obtained by extraction of 50% of lithium through charging (which will be hereinafter referred to as 50% charged state), when the focus is placed on 50% energy value of jump height of the absorption edge in XANES spectrum of Ni—K shell absorption edge of the above lithium-transition metal composite oxide.

In the lithium-nickel oxide, it is typically known that electrons on oxygen have a great influence on charge/discharge (Journal of Power Sources, 97-98 (2001) 326. and others), and electrons on oxygen are dissipated at the time of charging.

Thus, when the lithium-nickel oxide is exposed to high temperature at the time of charging, elimination of oxygen occurs, which thereby causes decomposition of active materials, and in its turn, degradation of capacity. In other words, a decrease of electrons on nickel in place of oxygen is preferably required to suppress degradation of capacity.

Thus, according to the present invention, the lithium composite oxide that causes a large state change of electrons on nickel is used for the cathode active material with a change of XANES spectrum as index.

The lithium composite oxide used in the present invention also preferably contains either or both of manganese (Mn) and titanium (Ti). Containing these elements may further extend a range of shift width of energy value between the initial state and the 50% charged state.

Next, how to prepare the lithium composite oxide will be described.

The lithium-transition metal composite oxide is obtained by preparing and mixing hydroxides of Ni, Co, Mn and Ti used as transition metal sources according to each composition, by adding LiOH used as lithium sources to a mixture of hydroxides, and by sintering the mixture in an oxygen atmosphere at temperatures ranging from 600° C. to 1100° C.

In this case, available starting materials for the transition metal sources are by no means limited to the above, and carbonates, nitrates and sulfates or the like of transition metals are also available.

Alternatively, hydroxide salts and carbonates of composite transition metals containing a plurality of species of transition metals are also available.

Meanwhile, for the starting materials of the lithium source, $Li_2O$, $Li_2CO_3$ and $LiNiO_3$ or the like may be also used in place of hydroxides.

Next, the lithium ion non-aqueous electrolyte secondary battery of the present invention will be described.

The non-aqueous electrolyte secondary battery comprises the cathode consisting of the cathode active material composed of the above lithium composite oxide, the anode consisting of the anode active material composed of the material capable of absorbing and releasing lithium thereinto and therefrom, and the non-aqueous electrolyte.

Herein, an amount of nickel contained in the cathode active material is preferably in a range of 5% to 40% in molar ratio to the total amount of the cathode active material. The amount of nickel within the above range is supposed to be effective, because a crystal structure and an electron state that are advantageous to insertion/extraction of lithium ion thereinto and therefrom are easily yielded. The amount of nickel out of the above range will possibly cause large lowering of charge/discharge capacity.

For the anode active material, materials capable of absorbing and releasing lithium therein and therefrom (insertion/extraction) electrochemically under a potential of 2.0 V or less to lithium metal are preferably used, and there is no special limitations on shapes and species thereof. Examples of available materials include non-graphitizable carbon, pyrolytic carbons, cokes (pitch coke, needle coke and petroleum coke), graphites (naturally occurred graphite, artificial graphite and graphite), vitreous carbons (glass-like carbons), sintered organic polymer compounds (carbonized organic polymer compounds obtained by sintering phenol resin, furan resin or the like at appropriate temperatures), fibrous carbon, activated carbon and carbon blacks or the like.

Other possible materials for the anode active material include materials forming lithium alloys containing lithium and any one of aluminum, lead, copper, indium or the like; metal oxides such as iron oxide, ruthenium oxide, molybdenum oxide, tungsten oxide, titanium oxide, tin oxide or those ensuring a relatively low potential and capable of absorbing and releasing lithium thereinto and therefrom and intermetallic compounds, as well as nitrides capable of absorbing and releasing lithium thereinto and extract therefrom likewise, and polymers such as polyacethylene and polypirol capable of absorbing and releasing lithium thereinto and therefrom.

It is to be noted that insertion of lithium into the above carbonaceous materials or alloyed materials may be carried out electrochemically within the battery after the battery is manufactured or may be carried out before or after manufacture of the battery as being supplied from a cathode or from a lithium source other than the cathode. Alternatively, insertion of lithium may also be accomplished through material synthesis by which the anode active material is obtained as a lithium-containing material at the time of manufacture of the battery.

In the lithium ion non-aqueous electrolyte secondary battery of the present invention, the cathode or the anode may be fabricated typically by forming, on the opposite faces of a long strip-shaped or rectangular-shaped current collector, a cathode active material compound layer or an anode active material compound layer coated with a cathode compound material or an anode compound material containing the above active material and the binder.

The current collector is by no means limited in particular, and any one of current correctors that provide current collection functions may be also used. From a viewpoint of forms, a current collector in a foil form or a reticular form such as meshes and expanded metal is also used in place of the above. Available materials for the cathode current collector include aluminum, stainless steel and nickel or the like, while available materials for the anode current collector include copper foil, stainless steel and nickel foil that are materials incapable of alloying with lithium.

The cathode compound material or the anode compound material may be obtained by adding, to the above active materials, known binders such as polyvinylidene fluoride, polyvinyl pyrolidone fluoride, styrene-butadiene resin and/or known additives inclusive of conductive materials such as graphite if the situation permits.

The cathode active material compound layer or the anode active material compound layer may be obtained typically by coating the cathode compound material or the anode compound material on the opposite faces of the current collector and by drying a resultant coating. Specifically, the binder and the organic solvent or the like are mixed to obtain a compound material in a slurry form, and the slurry-formed compound material is then coated on the current collector and dried to thereby obtain the cathode active material compound layer or the anode active material compound layer. Alternatively, it is also allowable to obtain a reinforced electrode by subjecting the active material with heat being applied thereto to pressure molding, no matter whether the binder is used or not.

While the lithium ion non-aqueous electrolyte secondary battery of the present invention comprises, as indispensable components, the cathode containing the cathode active material of the present invention, the anode and the non-aqueous electrolyte, a form of the battery is by no means limited in particular, and the battery may have a variety of forms such as a cylinder, a square, a coin, a button or the like.

In addition, in order to obtain a more secure enclosed-type non-aqueous electrolyte secondary battery, the lithium ion non-aqueous electrolyte secondary battery further comprising means such as a safety valve that is operated in response to a rise of pressure inside the battery so as to interrupt a current at the time of abnormal conditions such as overcharge is preferably required.

The non-aqueous electrolyte secondary battery of the present invention is configured with various materials described above, particularly, the specific cathode active material, and thus provided as that having large capacity and being excellent in capacity retention ratio in response to charge/discharge cycles.

According to a third aspect of the present invention, the cathode active material is a cathode active material preferably used for the lithium ion non-aqueous electrolyte secondary battery and composed of a first lithium-transition metal composite oxide mainly containing lithium and cobalt and having a layer structure and a second lithium-transition metal composite oxide having a layer structure and whose mean discharge voltage resulting from discharge under a current of 0.2 C down to a range of 4.25 V to 3.00 V is lower than that of the first composite oxide by 0.05 V or more.

The cathode active material of the present invention will now be described in detail. It is to be noted that "%" described in this specification represents a mass percentage, unless otherwise specified.

As described above, the cathode active material of the present invention is composed of a mixture of a first lithium-transition metal composite oxide A mainly containing lithium and cobalt and having a layer structure and a second lithium-transition metal composite oxide B obtained as a layer compound and whose mean discharge voltage resulting from discharge under a current of 0.2 C down to a range of 4.25 V to 3.00 V is lower than that of the above composite oxide A by 0.05 V or more. Thus, using the mixture of these composite oxides as the cathode active material may obtain a non-aqueous electrolyte secondary battery having large capacity and being excellent in over-discharge resistance.

The first lithium-transition metal composite oxide A used in the cathode active material of the present invention needs to be a material such as $LiCoO_2$ or those mainly containing lithium and cobalt, being capable of inserting and extracting lithium thereinto and therefrom and having a layer structure.

It is also allowable to use any of materials obtained by substituting part of components such as cobalt, for instance, or about 10% thereof in molar ratio, for instance, with a different species of elements such as Al and Mg or transition metal elements such as Ni and Mn.

It is to be noted that a description to the effect that "mainly containing lithium and cobalt" in this specification means that an amount of (Li+Co) contained in the composite oxide is equal to or more than 40% in molar ratio.

The above lithium-transition metal composite oxide A is obtained by adding a lithium source such as lithium carbonate to an oxide mainly containing cobalt, for instance, and by sintering a mixture in an air atmosphere at temperatures ranging from 600° C. to 1100° C. For materials of the composite oxide A, it is also allowable to use composite hydroxides, composite carbonates, organic acid-bases and oxides or the like containing these elements. Synthesis is by no means limited to the above method, and any one of optional methods such as hydrothermal synthesis is also applicable.

Meanwhile, the second lithium-transition metal composite oxide B used in the present invention needs to be a material including a layer compound capable of inserting and extracting lithium thereinto and therefrom and whose mean discharge voltage resulting from discharge under a current of 0.2

C down to a range of 4.25 V to 3.00 V is lower than that of the above composite oxide A by 0.05 V or more.

Use of thus-added material whose mean discharge voltage is regulated to the above value lowers a cathode potential in the final stage of discharge, and suppresses a rise of an anode potential so as to achieve improved over-discharge resistance.

The materials for the second lithium-transition metal composite oxide B are by no means limited in particular, and any one of materials whose mean discharge voltage is lower than that of the first composite oxide A by 0.05 V or more may be used, and examples of which include composite oxides obtained by substituting 20% or more parts of cobalt in the above lithium-cobalt composite oxide, for instance, with transition metal elements such as Ni and Mn, more specifically, oxides expressed by a chemical formula of $LiCo_xNi_yM-n_zO_2$ (provided that "x+y+z=1").

The above composite oxide B is obtained by adding a lithium source such as lithium hydroxide to a composite hydroxide obtained from an inorganic salt solution mainly containing nickel through co precipitation, for instance, and by sintering a mixture in an air or oxygen atmosphere at temperatures ranging from 600° C. to 1100° C. For materials of the composite oxide B, it is also allowable to use composite carbonates, organic acid-bases and oxides or the like containing these elements. Synthesis is by no means limited to the above method, and any one of optional methods such as solid-phase synthesis and hydrothermal synthesis or those that are effective in attaining the above properties of matter is also applicable.

Mixing of the first lithium-transition metal composite oxide A and the second lithium-transition metal composite oxide B may be carried out using a known mixing method. Alternatively, a method of adhering one grain to the other grain to thereby obtain composite grains is also applicable.

As for the mixing ratio of the composite oxide A to the composite oxide B, parts of the second lithium-transition metal composite oxide B in an oxide mixture (oxide A+oxide B) are preferably in a range of 4% or more to 50% or less. Specifically, this is because a decrease to less than 4% in parts of the composite oxide B makes it difficult to sufficiently lower the cathode potential, and thereby causes degradation of over-discharge resistance, whereas an increase to more than 50% in parts of the composite oxide B shifts a discharge curve toward a low voltage side, and thereby becomes susceptible to lowering of battery capacity in regular use.

The second lithium-transition metal composite oxide B is preferably adjusted to have a particle configuration, in which primary particles of 5 μm or less are aggregated into secondary particles. An increase to more than 5 μm in primary particle size causes the particles to be broken due to expansion and shrinkage in response to charge/discharge, and thereby becomes susceptible to degradation of cycle characteristics.

The lithium-transition metal composite oxides A and B are also preferably adjusted to have a mean particle size of 30 μm or less, more preferably, in a range of 2 to 30 μm. Specifically, an increase to more than 30 μm in the mean particle size makes it difficult to sufficiently mix the composite oxides together, yields a potential distribution inside the electrode, and thereby fails to obtain intended effects sufficiently in some cases.

While the lithium ion non-aqueous electrolyte secondary battery of the present invention comprises, as indispensable components, the cathode containing the cathode active material of the present invention, the anode and the non-aqueous electrolyte, a form of the battery is by no means limited in particular, and the battery may have various forms such as a cylinder, a square, a coin, a button, a laminated seal or the like. In order to obtain a more secure enclosed-type non-aqueous electrolyte secondary battery, the lithium ion non-aqueous electrolyte secondary battery further comprising a means such as a safety valve that is operated in response to a rise of pressure in the battery so as to interrupt a current at the time of abnormal conditions such as over-charge is preferably required.

The non-aqueous electrolyte secondary battery of the present invention is configured with various materials described above, particularly, the specific cathode active material, and thus provided as that having large capacity and being excellent in over-discharge resistance.

In the lithium ion non-aqueous electrolyte secondary battery of the present invention, fabrication of the cathode and the anode is carried out, for instance, using any one of methods such as one of coating a mixture prepared by adding a known binder and a known conductive material or the like to materials and by further adding a solvent to the mixture, one of coating a mixture prepared by adding a known binder and by heating the mixture and one of forming a molded electrode member by subjecting materials individually or a mixture thereof added with a binder or a mixture thereof further added with a conductive material to treatment such as molding. Fabrication of the cathode and the anode is by no means limited to the above methods. More specifically, the materials are added with the binder and the organic solvent or the like to obtain a compound material in a slurry form, and the slurry-formed compound material is coated on the current collector and dried to thereby obtain the cathode or the anode. Alternatively, it is also allowable to obtain an electrode having a predetermined strength by subjecting the active material with the heat being applied thereto to pressure molding, no matter whether the binder is used or not.

Manufacture of the battery may be carried out using any one of methods such as one of rolling up the cathode and the anode around a core while placing a separator in between and one of stacking the electrodes and the separator in order. The present invention is also effective in being applied to manufacture of a square-shaped battery using the winding-up method.

EXAMPLES

Examples and Comparative Examples of the non-aqueous electrolyte secondary battery using the cathode active material applied with the present invention will next be specifically described. In the following description, the non-aqueous electrolyte secondary battery was assumed to be a cylindrical non-aqueous electrolyte secondary battery.

Example 1

Firstly, the first lithium-transition metal composite oxide (A) was prepared in a following manner. For materials of the first lithium-transition metal composite oxide, lithium hydroxide, nickel monoxide and cobalt oxide, which are commercially available materials, were used. The lithium hydroxide, the nickel monoxide and the cobalt oxide were mixed in a following mixing ratio to prepare the first lithium-transition metal composite oxide. Specifically, in Example 1, the first lithium-transition metal composite oxide was prepared without being added with an additive M of a compound consisting of one or more transition metals or elements selected from Group 2, 3 and 4 elements of the long form of the periodic table.

Accordingly, mixing was carried out so that x, 1-y-z, y and z in the above chemical formula (1) of $Li_xNi_{1-y-z}Co_yM_zO_2$ expressing the first lithium-transition metal composite oxide satisfy x=1.02, 1-y-z=0.70, y=0.30 and z=0.

Next, a mixture obtained by mixing the lithium hydroxide, the nickel monoxide and the cobalt oxide in the above mixing ratio was sintered in an oxygen atmosphere of 800° C. for 10 hours and then pulverized to obtain a first lithium-transition metal composite oxide in a powdered form. Then, analysis of thus-obtained powder was carried out using an atomic absorption spectrophotometer, and results of the analysis confirmed that the first lithium-transition metal composite oxide is expressed by the above chemical formula (1). In addition, measurement of a mean particle size of the above powder was carried out using a laser diffraction technology, and results of the measurement confirmed that the above powder has a mean particle size of 15 μm. Further, X-ray diffraction measurement of the above powder was carried out, and results of the measurement confirmed that an obtained diffraction pattern is similar to a LiNiO diffraction pattern defined in 09-0063 of International Centre for Diffraction Data (which will be hereinafter simply referred to ICDD) and also that the above powder exhibits a layer structure similar to that of LiNiO.

Next, the second lithium-transition metal composite oxide (B) was prepared in a following manner. For materials of the second lithium-transition metal composite oxide, lithium hydroxide, nickel monoxide and manganese dioxide, which are commercially available materials, were used. The lithium hydroxide, the nickel monoxide and the manganese dioxide were mixed in a following mixing ratio to prepare the second lithium-transition metal composite oxide. Specifically, the second lithium-transition metal composite oxide was prepared without being added with an additive M' of a compound consisting of one or more transition metals or elements selected from Group 2, 3 and 4 elements of the long form of the periodic table of elements, like the first lithium-transition metal composite oxide. Thus-prepared second lithium transition metal oxide is a second lithium-transition metal composite oxide expressed by a following chemical formula (2).

Mixing was carried out so that s, 1-t-u, t and u in the chemical formula (2) of $Li_sNi_{1-t-u}Mn_tM'_uO_2$ expressing the second lithium-transition metal composite oxide satisfy s=1.02, 1-t-u=0.65, t=0.35 and u=0.

Next, a mixture obtained by mixing the lithium hydroxide, the nickel monoxide and the manganese dioxide in the above mixing ratio was sintered in an oxygen atmosphere of 800° C. for 10 hours, and then pulverized to obtain a second lithium-transition metal composite oxide in a powdered form. Analysis of thus-obtained powder was carried out using an atomic absorption spectrophotometer, and results of the analysis confirmed that the second lithium-transition metal composite oxide is expressed by the above chemical formula (2). In addition, measurement of a mean particle size of the above powder was carried out using a laser diffraction technology, and results of measurement confirmed that the above powder has a means particle size of 15 μm. Further, X-ray diffraction measurement of the above powder was carried out, and results of the measurement confirmed that an obtained diffraction pattern is similar to a LiNiO diffraction pattern defined in 09-0063 of ICDD and also that the above powder exhibits a layer structure similar to that of LiNiO.

Next, a cathode was fabricated. First, the lithium-transition metal composite oxide and the second lithium-transition metal composite oxide were mixed to prepare a cathode active material. The cathode active material was obtained by mixing in a first lithium-transition metal composite oxide-to-second lithium-transition metal composite oxide ratio of 50% by weight to 50% by weight. Next, 86% by weight of the cathode active material obtained by mixing the first lithium-transition metal composite oxide and the second lithium-transition metal composite oxide, 10% by weight of graphite as a conductive material and 4% by weight of polyvinylidene fluoride (which will be hereinafter referred to PVdF) as a binder were mixed and further added with N-methyl-2-pyrolidone (which will be hereinafter referred to as NMP) as an organic solvent to obtain a cathode compound material in a slurry form. Next, the slurry-formed cathode compound material was coated uniformly on the opposite faces of a long strip-shaped aluminum foil of 20 μm thick to form a cathode active material compound layer, then dried and compressed using a roll press machine to thereby obtain a cathode in a form of a long strip.

Next, an anode was fabricated. Artificial graphite in a powdered form was used for an anode active material, and to 90% by weight of artificial graphite was added 10% by weight of PVdF and further added with NMP to obtain an anode compound material in a slurry form. The slurry-formed anode compound material was uniformly coated on the opposite faces of a copper foil of 10 μm thick to form an anode active material compound layer, then dried and compressed using a roll press machine to thereby obtain an anode.

Next, a non-aqueous electrolyte solution was prepared. The non-aqueous electrolyte solution was obtained by dissolving $LiPF_6$ as solute in a solution prepared by mixing ethylene carbonate and methyl ethyl carbonate in a volume mixing ratio of 1:1 so as to adjust the concentration thereof to 1.0 mol/dm$^3$.

Next, a cylindrical non-aqueous electrolyte secondary battery was manufactured. First, thus-fabricated cathode and anode were spirally wound up a large number of times while placing a separator made of a porous polyolefin film in between to manufacture a spirally wound electrode member. The spirally wound electrode member is enclosed, with insulator plates mounted to both upper and lower faces of the electrode member, in a battery container made of nickel-plated iron. Current collection of the cathode was obtained by extracting one end of a cathode lead made of aluminum from the cathode current collector, while welding the other end to a current interrupt thin plate to establish electrical connection to a battery cap through the current interrupt thin plate. Current collection of the anode was obtained by extracting one end of the anode lead made of nickel from the anode current collector, while welding the other end to a bottom of the battery container.

Next, thus-prepared non-aqueous electrolyte solution was poured into the battery container with the above electrode member incorporated therein, and thereafter, the battery cap was fixed by caulking the battery container through an insulator sealing gasket to thereby fabricate a cylindrical non-aqueous electrolyte secondary battery having a diameter of 18 mm and a height of 65 mm. Specifically, the non-aqueous electrolyte secondary battery has a center pin connected to the cathode lead and the anode lead, a safety valve for letting gas out of the non-aqueous electrolyte battery when a pressure inside the non-aqueous electrolyte secondary battery increases more than a predetermined value, and a PTC (Positive Temperature Coefficient) element for preventing a rise of temperature in the non-aqueous electrolyte secondary battery.

Example 2

In Example 2, aluminum hydroxide was used, in addition to the lithium hydroxide, the nickel monoxide and the cobalt oxide, for the materials of the first lithium-transition metal composite oxide, and these materials were mixed in a following ratio. The first lithium-transition metal composite oxide of LiNiCoAlO was prepared similarly to Example 1, except that mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, z=0.05 and M=Al. Except for using this first lithium-transition metal composite oxide, the non-aqueous electrolyte secondary battery was manufactured similarly to Example 1.

Example 3

In Example 3, aluminum hydroxide was used, in addition to the lithium hydroxide, the nickel monoxide and the cobalt oxide, for materials of the second lithium-transition metal composite oxide, and these materials were mixed in a following ratio. The second lithium-transition metal composite oxide of LiNiMnAlO was prepared similarly to Example 1, except that mixing was carried out so that s, 1-t-u, t, u and M' in the chemical formula (2) of $Li_sNi_{1-t-u}Mn_tM'O_2$ expressing the second lithium-transition metal composite oxide satisfy s=1.02, 1-t-u=0.65, t=0.30, u=0.05 and M'=Al. Except for using this second lithium-transition metal composite oxide, the non-aqueous electrolyte secondary battery was manufactured similarly to Example 1.

Example 4

In Example 4, the first lithium-transition metal composite oxide expressed by the chemical formula of LiNiCoAlO was prepared as the first lithium-transition metal composite oxide similarly to the first lithium-transition metal composite oxide in Example 2. The second lithium-transition metal composite oxide expressed by the chemical formula LiNiMnAlO was prepared as the second lithium-transition metal composite oxide similarly to the second lithium-transition metal composite oxide in Example 3. Except for using this first lithium-transition metal composite oxide and this second lithium-transition metal composite oxide, the non-aqueous electrolyte secondary battery was manufactured similarly to Example 1.

Example 5

In Example 5, a first lithium-transition metal composite oxide of LiNiCoFeO was prepared similarly to Example 4, except that iron hydroxide in place of the aluminum hydroxide was used, in addition to the lithium hydroxide, the nickel monoxide and the cobalt oxide, for materials of the first lithium-transition metal composite oxide, and mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, z=0.05 and M=Fe. Except for using this first lithium-transition metal composite oxide, the non-aqueous electrolyte secondary battery was manufactured similarly to Example 4.

Example 6

In Example 6, a first lithium-transition metal composite oxide of LiNiCoSnO was prepared similarly to Example 4, except that tin oxide in place of the aluminum hydroxide was used, in addition to the lithium hydroxide, the nickel monoxide and the cobalt oxide, for materials of the first lithium-transition metal composite oxide, and mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, z=0.05 and M=Sn. Except for using this first lithium-transition metal composite oxide, the non-aqueous electrolyte secondary battery was manufactured similarly to Example 4.

Example 7

In Example 7, a first lithium-transition metal composite oxide of LiNiCoCrO was prepared similarly to Example 4, except that chromium oxide in place of the aluminum hydroxide was used, in addition to the lithium hydroxide, the nickel monoxide and the cobalt oxide, for materials of the first lithium-transition metal composite oxide, and mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, z=0.05 and M=Cr. Except for using this first lithium-transition metal composite oxide, the non-aqueous electrolyte secondary battery was manufactured similarly to Example 4.

Example 8

In Example 8, a first lithium-transition metal composition oxide of LiNiCoVO was prepared similarly to Example 4, except that vanadium pentoxide in place of the aluminum hydroxide was used, in addition to the lithium hydroxide, the nickel monoxide and the cobalt oxide, for materials of the first lithium-transition metal composite oxide, and mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, z=0.05 and M=V. Except for using this first lithium-transition metal composite oxide, the non-aqueous electrolyte secondary battery was manufactured similarly to Example 4.

Example 9

In Example 9, a first lithium-transition metal composite oxide of LiNiCoTiO was prepared similarly to Example 4, except that titanium oxide in place of the aluminum hydroxide was used, in addition to the lithium hydroxide, the nickel monoxide and the cobalt oxide, for materials of the first lithium-transition metal composite oxide, and mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, z=0.05 and M=Ti. Except for using this first lithium-transition metal composite oxide, the non-aqueous electrolyte secondary battery was manufactured similarly to Example 4.

Example 10

In Example 10, a first lithium-transition metal composite oxide of LiNiCoMgO was prepared similarly to Example 4, except that magnesium oxide in place of the aluminum hydroxide was used, in addition to the lithium hydroxide, the nickel monoxide and the cobalt oxide, for materials of the first lithium-transition metal composite oxide, and mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, Z=0.05 and M=Mg. Except for using this first lithium-transition metal composite oxide, the non-aqueous electrolyte secondary battery was manufactured similarly to Example 4.

Example 11

In Example 11, a first lithium-transition metal composite oxide of LiNiCoGaO was prepared similarly to Example 4, except that gallium nitrate in place of the aluminum hydroxide was used, in addition to the lithium hydroxide, the nickel monoxide and the cobalt oxide, for materials of the first lithium-transition metal composite oxide, and mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.25, z=0.05 and M=Ga. Except for using this first lithium-transition metal composite oxide, the non-aqueous electrolyte secondary battery was manufactured similarly to Example 4.

Example 12

In Example 12, a second lithium-transition metal composite oxide of LiNiMnFeO was prepared similarly to Example 4, except that iron hydroxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.65, t=0.30, u=0.05 and M'=Fe. Except for using this second lithium-transition metal composite oxide, the non-aqueous electrolyte secondary battery was manufactured similarly to Example 4.

Example 13

In Example 13, a second lithium-transition metal composite oxide of LiNiMnCoO was prepared similarly to Example 4, except that cobalt oxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.65, t=0.30, u=0.05 and M'=Co. Except for using this second lithium-transition metal composite oxide, the non-aqueous electrolyte secondary battery was manufactured similarly to Example 4.

Example 14

In Example 14, a second lithium-transition metal composite oxide of LiNiMnZnO was prepared similarly to Example 4, except that zinc hydroxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.65, t=0.30, u=0.05 and M'=Zn. Except for using this second lithium-transition metal composite oxide, the non-aqueous electrolyte secondary battery was manufactured similarly to Example 4.

Example 15

In Example 15, a second lithium-transition metal composite oxide of LiNiMnSnO was prepared similarly to Example 4, except that tin oxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M in the chemical formula (2) of $Li_sNi_{1-t-u}Mn_tM'_uO_2$ expressing the second lithium-transition metal composite oxide satisfy s=1.02, 1-t-u=0.65, t=0.30, u=0.05 and M'=Sn. Except for using this second lithium-transition metal composite oxide, the non-aqueous electrolyte secondary battery was manufactured similarly to Example 4.

Example 16

In Example 16, a second lithium-transition metal composite oxide of LiNiMnCrO was prepared similarly to Example 4, except that chromium oxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'O_2$ expressing the second lithium-transition metal composite oxide satisfy s=1.02. 1-t-u=0.65, t=0.30, u=0.05 and M'=Cr. Except for using this second lithium-transition metal composite oxide, the non-aqueous electrolyte secondary battery was manufactured similarly to Example 4.

Example 17

In Example 17, a second lithium-transition metal composite oxide of LiNiMnVO was prepared similarly to Example 4, except that vanadium pentoxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.65, t=0.30, u=0.05 and M'=V. Except for using this second lithium-transition metal composite oxide, the non-aqueous electrolyte secondary battery was manufactured similarly to Example 4.

Example 18

In Example 18, a second lithium-transition metal composite oxide of LiNiMnTiO was prepared similarly to Example 4, except that titanium oxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.65, t=0.30, t=0.05 and M'=Ti. Except for using this second lithium-transition metal composite oxide, the non-aqueous electrolyte secondary battery was manufactured similarly to Example 4.

Example 19

In Example 19, a second lithium-transition metal composite oxide of LiNiMnMgO was prepared similarly to Example 4, except that magnesium oxide in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.65, t=0.30, u=0.05 and M'=Mg. Except for using this second lithium-transition metal composite oxide, the non-aqueous electrolyte secondary battery was manufactured similarly to Example 4.

Example 20

In Example 20, a second lithium-transition metal composite oxide of LiNiMnGaO was prepared similarly to Example 4, except that gallium nitrate in place of the aluminum hydroxide was used, in addition to the lithium hydroxide, the nickel monoxide and the cobalt oxide, for materials of the second lithium-transition metal composite oxide, and mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.65, t=0.30, u=0.05 and M'=Ga. Except for using this second lithium-transition metal composite oxide, the non-aqueous electrolyte secondary battery was manufactured similarly to Example 4.

Example 21

In Example 21, a cathode active material was prepared similarly to Example 4, except that mixing was carried out in a first lithium-transition metal composite oxide (A)-to-second lithium-transition metal composite oxide (B) ratio of 15% by weight to 85% by weight. Except for using this cathode active material, the non-aqueous electrolyte secondary battery was manufactured similarly to Example 4.

Example 22

In Example 22, a cathode active material was prepared similarly to Example 4, except that mixing was carried out in a first lithium-transition metal composite oxide (A)-to-second lithium-transition metal composite oxide (B) ratio of 30% by weight to 70% by weight. Except for using this cathode active material, the non-aqueous electrolyte secondary battery was manufactured similarly to Example 4.

Example 23

In Example 23, a cathode active material was prepared similarly to Example 4, except that mixing was carried out in a first lithium-transition metal composite oxide (A)-to-second lithium-transition metal composite oxide (B) ratio of 70% by weight to 30% by weight. Except for using this cathode active material, the non-aqueous electrolyte secondary battery was manufactured similarly to Example 4.

Example 24

In Example 24, a cathode active material was prepared similarly to Example 4, except that mixing was carried out in a first lithium-transition metal composite oxide (A)-to-second lithium-transition metal composite oxide (B) ratio of 85% by weight to 15% by weight. Except for using this cathode active material, the non-aqueous electrolyte secondary battery was manufactured similarly to Example 4.

Example 25

A first lithium-transition metal composite oxide having a mean particle size of 2 μm was prepared by pulverizing the first lithium-transition metal composite oxide of the chemical formula of LiNiCoAlO, which was obtained by sintering through operations similarly to Example 4, using an automatic mortar for a sufficient period of time, and by removing coarse particles therefrom using a sieve. Except for using this first lithium-transition metal composite oxide, the non-aqueous electrolyte secondary battery was manufactured similarly to Example 4.

Example 26

A first lithium-transition metal compound oxide having a mean particle size of 8 μm was prepared by pulverizing the first lithium-transition metal composite oxide of the chemical formula of LiNiCoAlO, which was obtained by sintering through operations similarly to Example 4, using an automatic mortar for a certain period of time, and by removing coarse particles therefrom using a sieve. Except for using this first lithium-transition metal composite oxide, the non-aqueous electrolyte secondary battery was manufactured similarly to Example 4.

Example 27

A first lithium-transition metal compound oxide having a mean particle size of 20 μm was prepared by pulverizing the first lithium-transition metal composite oxide of the chemical formula of LiNiCoAlO, which was obtained by sintering through operations similarly to Example 4, using an automatic mortar for a short period of time, and by removing coarse particles therefrom using a sieve. Except for using this first lithium-transition metal composite oxide, the non-aqueous electrolyte secondary battery was manufactured similarly to Example 4.

Example 28

A first lithium-transition metal composite oxide having a mean particle size of 30 μm was prepared by pulverizing the first lithium-transition metal composite oxide of the chemical formula of LiNiCoAlO, which was obtained by sintering through operations similarly to Example 4, using an automatic mortar for a short period of time, and by removing coarse particles therefrom using a sieve. Except for using this first lithium-transition metal composite oxide, the non-aqueous electrolyte secondary battery was manufactured similarly to Example 4.

Example 29

A second lithium-transition metal composite oxide having a mean particle size of 2 μm was prepared by pulverizing the second lithium-transition metal composite oxide of the chemical formula of LiNiMnAlO, which was obtained by sintering through operations similarly to Example 4, using an automatic mortar for a sufficient period of time, and by removing coarse particles therefrom using a sieve. Except for using this second lithium-transition metal composite oxide, the non-aqueous electrolyte secondary battery was manufactured similarly to Example 4.

Example 30

A second lithium-transition metal composite oxide having a mean particle size of 9 μm was prepared by pulverizing the second lithium-transition metal composite oxide of the chemical formula of LiNiMnAlO, which was obtained by sintering through operations similarly to Example 4, using an automatic mortar for a sufficient period of time, and by removing coarse particles therefrom using a sieve. Except for using this second-lithium transition metal composite oxide, the non-aqueous electrolyte secondary battery was manufactured similarly to Example 4.

Example 31

A second lithium-transition metal composite oxide having a mean particle size of 18 μm was prepared by pulverizing the second lithium-transition metal composite oxide of the chemical formula of LiNiMnAlO, which was obtained by sintering through operations similarly to Example 4, using an automatic mortar for a certain period of time, and by removing coarse particles therefrom using a sieve. Except for using this second lithium-transition metal composite oxide, the non-aqueous electrolyte secondary battery was manufactured similarly to Example 4.

Example 32

A second lithium-transition metal composite oxide having a mean particle size of 30 μm was prepared by pulverizing the second lithium-transition metal composite oxide of the chemical formula of LiNiMnAlO, which was obtained by sintering through operations similarly to Example 4, using an automatic mortar for a short period of time, and by removing coarse particles therefrom using a sieve. Except for using this second lithium-transition metal composite oxide, the non-aqueous electrolyte secondary battery was manufactured similarly to Example 4.

Example 33

In Example 33, cobalt parts y in the first lithium-transition metal composite oxide were altered to 0.05, more specifically, the first lithium-transition composite oxide was prepared under conditions that mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.90, y=0.05, z=0.05 and M=Al. Except for using this first lithium-transition metal composite oxide, the non-aqueous electrolyte secondary battery was manufactured similarly to Example 4.

Example 34

In Example 34, cobalt parts y in the first lithium-transition metal composite oxide were altered to 0.50, more specifically, the first lithium-transition metal composite oxide was prepared similarly to the first lithium-transition metal composite oxide in Example 4 under conditions that mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.45, y=0.5, z=0.05 and M=Al. Except for using this first lithium-transition metal composite oxide, the non-aqueous electrolyte secondary battery was manufactured similarly to Example 4.

Example 35

In Example 35, manganese parts t in the second lithium-transition metal composite oxide were altered to 0.05, more specifically, the second lithium-transition metal composite oxide was prepared similarly to the second lithium-transition metal composite oxide in Example 4 under conditions that mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.90, t=0.05, u=0.05 and M'=Al. Except for using this second lithium-transition metal composite oxide, the non-aqueous electrolyte secondary battery was manufactured similarly to Example 4.

Example 36

In Example 36, manganese parts t in the second lithium-transition metal composite oxide were altered to 0.50, more specifically, the second lithium-transition metal composite oxide was prepared similarly to the second lithium-transition metal composite oxide in Example 4 under conditions that mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.45, t=0.5, u=0.05 and M'=Al. Except for using this second lithium-transition metal composite oxide, the non-aqueous electrolyte secondary battery was manufactured similarly to Example 4.

Comparative Example 1

In Comparative Example 1, lithium hydroxide, nickel monoxide and cobalt oxide were used for materials of a first lithium-transition metal composite oxide and mixed in a following mixing ratio. Mixing was carried out so that x, 1-y-z, y, z in the chemical formula (1) of $Li_xNi_{1-y-z}Co_yM_zO_2$ expressing the first lithium-transition metal composite oxide satisfy x=1.02, 1-y-z=0.70, y=0.30 and z=0. The first lithium-transition metal composite oxide is expressed by the chemical formula of LiNiCoO and was prepared similarly to the first lithium-transition metal composite oxide in Example 4. In Comparative Example 1, a cathode active material singly composed of the first lithium-transition metal composite oxide was prepared without using the second lithium-transition metal composite oxide. Except for using this cathode active material, the non-aqueous electrolyte secondary battery was manufactured similarly to Example 4.

Comparative Example 2

In Comparative Example 2, lithium hydroxide, nickel monoxide and manganese dioxide, which are commercially available materials, were used for materials of a second lithium-transition metal composite oxide. As the second lithium-transition metal composite oxide expressed by a chemical formula of LiNiMnO, a second lithium-transition metal composite oxide of $Li_sNi_{1-t-u}Mn_tM'_uO_2$ was prepared similarly to Example 4. In Comparative Example 2, a cathode active material singly composed of the second lithium-transition metal composite oxide was prepared without using the first lithium-transition metal composite oxide. Except for using this cathode active material, the non-aqueous electrolyte secondary battery was manufactured similarly to Example 4.

Comparative Example 3

In Comparative Example 3, a cathode active material was prepared similarly to Example 4, except that mixing was carried out in a first lithium-transition metal composite oxide-to-second lithium-transition metal composite oxide ratio of 10% by weight to 90% by weight. Except for using this cathode active material, the non-aqueous electrolyte secondary battery was manufactured similarly to Example 4.

Comparative Example 4

In Comparative Example 4, a cathode active material was prepared similarly to Example 4, except that mixing was carried out in a first lithium-transition metal composite oxide-to-second lithium-transition metal composite oxide ratio of 90% by weight to 10% by weight. Except for using this cathode active material, the non-aqueous electrolyte secondary battery was manufactured similarly to Example 4.

Comparative Example 5

A first lithium-transition metal composite oxide having a mean particle size of 1 µm was prepared by pulverizing the first lithium-transition metal composite oxide of the chemical formula of LiNiCoAlO, which was obtained by sintering through operations similarly to Example 4, using an automatic mortar for a sufficient period of time, and by removing coarse particles therefrom using a sieve. Except for using this first lithium-transition metal composite oxide, the non-aqueous electrolyte secondary battery was manufactured similarly to Example 4.

Comparative Example 6

A first lithium-transition metal composite oxide having a mean particle size of 40 µm was prepared by pulverizing the first lithium-transition metal composite oxide of the chemical formula of LiNiCoAlO, which was obtained by sintering through operations similarly to Example 4, using an automatic mortar for a short period of time, and by removing coarse particles therefrom using a sieve. Except for using this first lithium-transition metal composite oxide, the non-aqueous electrolyte secondary battery was manufactured similarly to Example 4.

Comparative Example 7

A second lithium-transition metal composite oxide having a mean particle size of 1 µm was prepared by pulverizing the second lithium-transition metal composite oxide of the chemical formula of LiNiMnAlO, which was obtained by sintering through operations similarly to Example 4, using an automatic mortar for a sufficient period of time, and by removing coarse particles therefrom using a sieve. Except for using this second lithium-transition metal composite oxide, the non-aqueous electrolyte secondary battery was manufactured similarly to Example 4.

Comparative Example 8

A second lithium-transition metal composite oxide having a mean particle size of 40 µm was prepared by pulverizing the second lithium-transition metal composite oxide of the chemical formula of LiNiMnAlO, which was obtained by sintering through operations similarly to Example 4, using an automatic mortar for a sufficient period of time, and by removing coarse particles therefrom using a sieve. Except for using this second-lithium transition metal composite oxide, the non-aqueous electrolyte secondary battery was manufactured similarly to Example 4.

Comparative Example 9

In Comparative Example 9, cobalt parts y in the first lithium-transition metal composite oxide was altered to 0.01, more specifically, the first lithium-transition metal composite oxide was prepared similarly to the first lithium-transition metal composite oxide in Example 4 under conditions that mixing was carried out so that x, 1-y-z, y, z and M in the chemical formula (1) of $Li_xNi_{1-y-z}Co_yM_zO_2$ expressing the first lithium-transition metal composite oxide satisfy x=1.02, 1-y-z=0.70, y=0.01, z=0.05 and M=Al. Except for using this first lithium-transition metal composite oxide, the non-aqueous electrolyte secondary battery was manufactured similarly to Example 4.

Comparative Example 10

In Comparative Example 10, cobalt parts y in the first lithium-transition metal composite oxide were altered to 0.60, more specifically, the first lithium-transition metal composite oxide was prepared similarly to the first lithium-transition metal composite oxide in Example 4 under conditions that mixing was carried out so that x, 1-y-z, y, z and M in the chemical formula (1) of $Li_xNi_{1-y-z}Co_yM_zO_2$ expressing the first lithium-transition metal composite oxide satisfy x 1.02, 1-y-z=0.70, y=0.60, z=0.05 and M=Al. Except for using this first lithium-transition metal composite oxide, the non-aqueous electrolyte secondary battery was manufactured similarly to Example 4.

Comparative Example 11

In Comparative Example 11, manganese parts t in the second lithium-transition metal composite oxide were altered to 0.01, more specifically, the second lithium-transition metal composite oxide was prepared similarly to the second lithium-transition metal composite oxide in Example 4 under conditions that mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.70, t=0.01, u=0.05 and M'=Al. Except for using this second lithium-transition metal composite oxide, the non-aqueous electrolyte secondary battery was manufactured similarly to Example 4.

Comparative Example 12

In Comparative Example 12, manganese parts t in the second lithium-transition metal composite oxide was altered to 0.60, more specifically, the second lithium-transition metal composite oxide was prepared similarly to the second lithium-transition metal composite oxide in Example 4 under conditions that mixing was carried out so that s, 1-t-u, t, u and M' in the chemical formula (2) of $Li_sNi_{1-t-u}Mn_tM'_uO_2$ expressing the second lithium-transition metal composite oxide satisfy s=1.02, 1-t-u=0.70, t=0.60, u=0.05 and M'=Al. Except for using this second lithium-transition metal composite oxide, the non-aqueous electrolyte secondary battery was manufactured similarly to Example 4.

Next, thus-fabricated non-aqueous electrolyte secondary batteries in Examples and Comparative Examples were subjected to measurements of initial discharge capacity under conditions that the batteries were charged under a current of 1000 mA and a voltage of 4.20 V in an atmosphere of 23° C. for 2.5 hours and then discharged under a current of 1500 mA down to 2.75 V. Measurement of relative discharge capacity after the 100th cycle in an atmosphere of 23° C. was also carried out by repeating charge/discharge under conditions similar to those for the measurement of the initial discharge capacity, so as to calculate capacity retention ratio after the 100th cycle to the initial discharge capacity. Measurement of capacity retention ratio after the 100th cycle under repetitive charge/discharge in an atmosphere of 50° C. was also carried out under conditions similar to those for the measurement in the atmosphere of 23° C., except that a temperature was set at 50° C.

Table 1 shows evaluation results of the initial discharge capacity, the capacity retention ratio after the 100th cycle in the atmosphere of 23° C. and the capacity retention ratio after the 100th cycle in the atmosphere of 50° C. in Examples 1 to 20 and Comparative Examples 1 and 2.

tion metal composite oxide, and the cathode active material is not added with any compound composed of one or more transition metals or elements selected from Group 2, 3 and 4 elements of the periodic table, and thereby causes deterioration of crystal structure under repetitive charge/discharge, because the first lithium-transition metal composite oxide exhibits an unstable crystal structure. Thus, the cathode active material singly composed of the first lithium-transition metal composite oxide causes degradation of charge/discharge cycle capacity retention ratio. In particular, the above cathode active material remarkably degrades charge/discharge cycle capacity retention ratio under high temperature environment, because deterioration of the crystal structure is promoted due to high temperature and, besides, decomposition of the electrolyte is caused.

On the contrary, Examples 1 to 20 show that adding the second lithium-transition metal composite oxide to the first lithium-transition metal composite oxide allows a change of crystal structure of the cathode active material in response to charge/discharge to be reduced, and results in suppression of degradation of crystal structure of the whole cathode active material in response to the charge/discharge, because the second lithium-transition metal composite oxide exhibits a stabled crystal structure. Thus, the cathode active material

TABLE 1

| | | M in first lithium-transition metal composite oxide (A) | M' in second lithium-transition metal composite oxide (B) | Mixing ratio (A)/(B) (% by weight) | Composition of first lithium-transition metal composite oxide (A) | Composition of second lithium-transition metal composite oxide (B) | Initial discharge capacity [mAh] | Capacity retention ratio after 100th cycle[%] | |
|---|---|---|---|---|---|---|---|---|---|
| | | | | | | | | 23° C. | 50° C. |
| Example | 1 | None | None | 50/50 | $Li_{1.02}Ni_{0.70}Co_{0.30}O_2$ | $Li_{1.02}Ni_{0.65}Mn_{0.35}O_2$ | 1720 | 91.3 | 81.9 |
| | 2 | Al | NZ | 50/50 | $Li_{1.02}Ni_{0.70}Co_{0.25}Al_{0.05}O_2$ | $Li_{1.02}Ni_{0.65}Mn_{0.35}O_2$ | 1710 | 93.1 | 82.9 |
| | 3 | None | Al | 50/50 | $Li_{1.02}Ni_{0.70}Co_{0.30}O_2$ | $Li_{1.02}Ni_{0.65}Mn_{0.30}Al_{0.05}O_2$ | 1690 | 93.4 | 83.1 |
| | 4 | Al | Al | 50/50 | $Li_{1.02}Ni_{0.70}Co_{0.25}Al_{0.05}O_2$ | $Li_{1.02}Ni_{0.65}Mn_{0.30}Al_{0.05}O_2$ | 1700 | 95.2 | 84.5 |
| | 5 | Fe | Al | 50/50 | $Li_{1.02}Ni_{0.70}Co_{0.25}Fe_{0.05}O_2$ | $Li_{1.02}Ni_{0.65}Mn_{0.30}Al_{0.05}O_2$ | 1690 | 94.4 | 84.4 |
| | 6 | Sn | Al | 50/50 | $Li_{1.02}Ni_{0.70}Co_{0.25}Sn_{0.05}O_2$ | $Li_{1.02}Ni_{0.65}Mn_{0.30}Al_{0.05}O_2$ | 1710 | 94.8 | 83.8 |
| | 7 | Cr | Al | 50/50 | $Li_{1.02}Ni_{0.70}Co_{0.25}Cr_{0.05}O_2$ | $Li_{1.02}Ni_{0.65}Mn_{0.30}Al_{0.05}O_2$ | 1710 | 95 | 84.6 |
| | 8 | V | Al | 50/50 | $Li_{1.02}Ni_{0.70}Co_{0.25}V_{0.05}O_2$ | $Li_{1.02}Ni_{0.65}Mn_{0.30}Al_{0.05}O_2$ | 1720 | 93.9 | 84.3 |
| | 9 | Ti | Al | 50/50 | $Li_{1.02}Ni_{0.70}Co_{0.25}Ti_{0.05}O_2$ | $Li_{1.02}Ni_{0.65}Mn_{0.30}Al_{0.05}O_2$ | 1680 | 94.9 | 85 |
| | 10 | Mg | Al | 50/50 | $Li_{1.02}Ni_{0.70}Co_{0.25}Mg_{0.05}O_2$ | $Li_{1.02}Ni_{0.65}Mn_{0.30}Al_{0.05}O_2$ | 1680 | 94.1 | 85.1 |
| | 11 | Ga | Al | 50/50 | $Li_{1.02}Ni_{0.70}Co_{0.25}Ga_{0.05}O_2$ | $Li_{1.02}Ni_{0.65}Mn_{0.30}Al_{0.05}O_2$ | 1670 | 94.5 | 84 |
| | 12 | Al | Fe | 50/50 | $Li_{1.02}Ni_{0.70}Co_{0.25}Al_{0.05}O_2$ | $Li_{1.02}Ni_{0.65}Mn_{0.30}Fe_{0.05}O_2$ | 1690 | 93.6 | 84.3 |
| | 13 | Al | Co | 50/50 | $Li_{1.02}Ni_{0.70}Co_{0.25}Al_{0.05}O_2$ | $Li_{1.02}Ni_{0.65}Mn_{0.30}Co_{0.05}O_2$ | 1710 | 94.1 | 83.9 |
| | 14 | Al | Zn | 50/50 | $Li_{1.02}Ni_{0.70}Co_{0.25}Al_{0.05}O_2$ | $Li_{1.02}Ni_{0.65}Mn_{0.30}Zn_{0.05}O_2$ | 1700 | 94 | 84.2 |
| | 15 | Al | Sn | 50/50 | $Li_{1.02}Ni_{0.70}Co_{0.25}Al_{0.05}O_2$ | $Li_{1.02}Ni_{0.65}Mn_{0.30}Sn_{0.05}O_2$ | 1700 | 94.2 | 84.9 |
| | 16 | Al | Cr | 50/50 | $Li_{1.02}Ni_{0.70}Co_{0.25}Al_{0.05}O_2$ | $Li_{1.02}Ni_{0.65}Mn_{0.30}Cr_{0.05}O_2$ | 1710 | 94.4 | 84.3 |
| | 17 | Al | V | 50/50 | $Li_{1.02}Ni_{0.70}Co_{0.25}Al_{0.05}O_2$ | $Li_{1.02}Ni_{0.65}Mn_{0.30}V_{0.05}O_2$ | 1710 | 93.3 | 84.6 |
| | 18 | Al | Ti | 50/50 | $Li_{1.02}Ni_{0.70}Co_{0.25}Al_{0.05}O_2$ | $Li_{1.02}Ni_{0.65}Mn_{0.30}Ti_{0.05}O_2$ | 1680 | 94.1 | 84.4 |
| | 19 | Al | Mg | 50/50 | $Li_{1.02}Ni_{0.70}Co_{0.25}Al_{0.05}O_2$ | $Li_{1.02}Ni_{0.65}Mn_{0.30}Mg_{0.05}O_2$ | 1690 | 94.7 | 84.5 |
| | 20 | Al | Ga | 50/50 | $Li_{1.02}Ni_{0.70}Co_{0.25}Al_{0.05}O_2$ | $Li_{1.02}Ni_{0.65}Mn_{0.30}Ga_{0.05}O_2$ | 1670 | 94.2 | 84.7 |
| Comparative example | 1 | None | — | 100/0 | $Li_{1.02}Ni_{0.70}Co_{0.30}O_2$ | None | 1820 | 88.1 | 59.2 |
| | 2 | — | None | 0/100 | None | $Li_{1.02}Ni_{0.65}Mn_{0.35}O_2$ | 1510 | 95.9 | 86 |

It is known from the evaluation results summarized in Table 1 that Examples 1 to 20, in which the cathode active material is composed of the mixture of the first lithium-transition metal composite oxide and the second lithium-transition metal composite oxide, show improved capacity retention ratio after the 100th cycle in the atmospheres of 23° C. and 50° C. as compared with that of Comparative Example 1, in which the cathode active material is singly composed of the first lithium-transition metal composite oxide.

Comparative Example 1 shows a case where the cathode active material is singly composed of the first lithium-transishows improved capacity retention ratio after the 100th cycle in the atmospheres of 23° C. and 50° C.

It is also known from the evaluation results summarized in Table 1 that Examples 1 to 20 show larger initial discharge capacity as compared with that of Comparative Example 2, in which the cathode active material is singly composed of the second lithium-transition metal composite oxide.

Comparative Example 2 shows a case where the cathode active material is singly composed of the second lithium-transition metal composite oxide, and the cathode active material is not added with any compound composed of one or more transition metals or elements selected from Group 2, 3 and 4 elements of the periodic table, and thereby causes lowering of initial discharge capacity, because the second lithium-transition metal composite oxide has low capacity.

On the contrary, Examples 1 to 20 show that adding the first lithium-transition metal composite oxide to the second lithium-transition metal composite oxide results in improvement of initial discharge capacity of the whole cathode active material, because the first lithium-transition metal composite oxide has large capacity.

As judged from the above, it is apparent that use of the cathode active material composed of the mixture of the first lithium-transition metal composite oxide and the second lithium-transition metal composite oxide in manufacture of the non-aqueous electrolyte secondary battery is effective in raising the initial discharge capacity, increasing the energy density and also in upgrading the charge/discharge cycle capacity retention ratio. Specifically, larger initial discharge capacity and improved charge/discharge cycle capacity retention ratio may be also achieved, even though any transition metal or element selected from Group 2, 3 and 4 elements of the periodic table is not added to the first lithium-transition metal composite oxide and the second lithium-transition metal composite oxide, like Example 1.

Next, Table 2 shows evaluation results of the initial discharge capacity, the capacity retention ratio after the 100th cycle in the atmosphere of 23° C. and the capacity retention ratio after the 100th cycle in the atmosphere of 50° C. in Examples 1 and 21 to 24 and Comparative Examples 3 and 4. It is to be noted that the additives M and M' to be added to the first lithium-transition metal composite oxide and the second lithium-transition metal composite oxide all represent Al in Examples 1 and 21 to 24 and Comparative Examples 3 and 4.

TABLE 2

|  |  | Mixing ratio of first lithium-transition metal composite oxide (A) to second lithium-transition metal composite oxide (B) (% by weight) | Initial discharge capacity | Capacity retention ratio after 100th cycle [%] | |
|---|---|---|---|---|---|
|  |  | (A)/(B) | [mAh] | 23° C. | 50° C. |
| Example | 1 | 50/50 | 1700 | 95.2 | 84.5 |
|  | 21 | 15/85 | 1610 | 95.4 | 85.5 |
|  | 22 | 30/70 | 1680 | 95.5 | 84.5 |
|  | 23 | 70/30 | 1710 | 93.3 | 83.3 |
|  | 24 | 85/15 | 1720 | 91.8 | 73.9 |
| Comparative | 3 | 10/90 | 1540 | 96.1 | 86.8 |
| Example | 4 | 90/10 | 1740 | 89.3 | 61.3 |

It is known from the evaluation results summarized in Table 2 that Examples 1 and 21 to 24, in which the mixing ratio of the first lithium-transition metal composite oxide to the second lithium-transition metal composite oxide was adjusted to 15% by weight or more to 85% by weight or less with respect to the whole cathode active material, show larger initial discharge capacity as compared with that of Comparative Example 3, in which the first lithium-transition metal composite oxide and the second lithium transition-metal composite oxide were mixed in a ratio of 10% by weight to 90% by weight.

Comparative Example 3 shows that use of a mixture of 10% by weight of the first lithium-transition metal composite oxide and 90% by weight of the second lithium-transition metal composite oxide for the cathode active material causes remarkable lowering of the initial discharge capacity as compared with that of Examples 1 and 21 to 24, because the low-capacity second lithium-transition metal composite oxide accounts for a large percentage of the cathode active material.

On the contrary, Examples 1 and 21 to 24 show that adding the second lithium-transition metal composite oxide in a ratio of 15% by weight or more to 85% by weight or less with respect to the whole cathode active material results in larger initial discharge capacity, because the large-capacity first lithium-transition metal composite oxide is contained in proper percent by weight with respect to the whole cathode active material. Examples 1 and 21 to 24 also show that the initial discharge capacity increases with increasing first lithium-transition metal composite oxide in mixing ratio.

It is also known from the evaluation results summarized in Table 2 that Examples 1 and 21 to 24 show improved capacity retention ratio after the 100th cycle in the atmospheres of 23° C. and 50° C. as compared with that of Comparative Example 4, in which 90% of the first lithium-transition metal composite oxide and 10% of the second lithium-transition metal composite oxide were mixed.

Comparative Example 4 shows that use of a mixture of 90% by weight of the first lithium-transition metal composite oxide and 10% by weight of the second lithium-transition metal composite oxide for the cathode active material promotes deterioration of the crystal structure under repetitive charge/discharge and thereby causes degradation of charge/discharge cycle capacity retention ratio, because the first lithium-transition metal composition oxide having the unstable crystal structure accounts for a large percentage of the cathode active material. In particular, the above cathode active material causes remarkable degradation of capacity retention ratio after the 100th cycle in the atmosphere of 50° C., because deterioration of the crystal structure is promoted under high temperature environment, and besides, degradation of the electrolyte is also caused.

On the contrary, Examples 1 and 21 to 24 show that adding the first lithium-transition metal composite oxide in a ratio of 15% by weight or more to 85% by weight or less by weight with respect to the whole cathode active material allows a change of crystal structure of the cathode active material in response to charge/discharge to be suppressed, and results in improvement of charge/discharge cycle capacity retention ratio, because the first lithium-transition metal composite oxide is added in proper percent by weight with respect to the whole cathode active material.

As judged from the above, it is known that use of the cathode active material, in which the first lithium-transition metal composite oxide is added in a ratio of 15% by weight or more to 85% by weight or less with respect to the whole cathode active material, in manufacture of the non-aqueous electrolyte secondary battery is successful in raising initial discharge capacity and also in improving charge/discharge cycle capacity retention ratio.

Next, Table 3 shows evaluation results of the initial discharge capacity, the capacity retention ratio after the 100th cycle in the atmosphere of 23° C. and the capacity retention ratio after the 100th cycle in the atmosphere of 50° C. in Examples 1 and 27 to 32 and Comparative Examples 5 to 8. It is to be noted that a first lithium-transition metal composite oxide and second lithium-transition metal composite oxide are mixed in a ratio of 50% by weight to 50% by weight.

TABLE 3

| | | Mean particle size [μm] | | | Capacity retention ratio after 100th cycle [%] | |
|---|---|---|---|---|---|---|
| | | First lithium-transition metal composite oxide | Second lithium-transition metal composition oxide | Initial discharge capacity [mAh] | 23° C. | 50° C. |
| Example | 1 | 15 | 15 | 1700 | 95.2 | 84.5 |
| | 25 | 2 | 15 | 1730 | 92.9 | 83.2 |
| | 26 | 8 | 15 | 1690 | 94.8 | 85.1 |
| | 27 | 20 | 15 | 1710 | 95.4 | 84.6 |
| | 28 | 30 | 15 | 1700 | 91.7 | 80 |
| | 29 | 15 | 2 | 1720 | 93.3 | 84.5 |
| | 30 | 15 | 9 | 1720 | 94.5 | 83.9 |
| | 31 | 15 | 18 | 1710 | 92.9 | 85.3 |
| | 32 | 15 | 30 | 1700 | 93 | 82.1 |
| Comparative Example | 5 | 1 | 15 | 1720 | 87.9 | 78.4 |
| | 6 | 40 | 15 | 1710 | 84.7 | 62.2 |
| | 7 | 15 | 1 | 1730 | 89.2 | 79.1 |
| | 8 | 15 | 40 | 1690 | 81.5 | 60.5 |

It is known from the evaluation results summarized in Table 3 that Examples 1 and 27 to 32, in which the mean particle size of each of the first lithium-transition metal composite oxide and the second lithium-transition metal composite oxide was adjusted to a range of 2 μm or more to 30 μm or less, show improved capacity retention ratio after the 100th cycle in the atmosphere of 50° C. as compared with that of Comparative Examples 5 to 8, in which either one of the first lithium-transition metal composite oxide and the second lithium-transition metal composite oxide was adjusted to have the mean particle of 1 μm or 40 μm, while the average mean particle of the other was adjusted to 15 μm.

Comparative Examples 5 to 8 show that adjusting the mean particle size of either one of the first lithium-transition metal composite oxide and the second lithium-transition metal composite oxide to less than 2 μm while adjusting the other to 15 μm promotes decomposition of the electrolyte and thereby causes more degradation of cycle capacity retention ratio in the atmosphere of 50° C. as compared with that of Examples 1 and 27 to 32, because a contact area between the cathode active material and the electrolyte solution is increased in excess. An increase to more than 30 μm in mean particle size makes it difficult to sufficiently mix the first lithium-transition metal composite oxide and the second lithium-transition metal composite oxide, and thereby causes degradation of cycle capacity retention ratio, particularly, degradation of cycle capacity retention ratio in the atmosphere of 50° C.

On the contrary, Examples 1 and 25 to 28 show that use of the mixture of the first lithium-transition metal composite oxide obtained by adjusting the mean particle size to a range of 2 μm or more to 30 μm or less and the second lithium-transition metal composite oxide obtained by adjusting the mean particle size constant as much as 15 μm for the cathode active material allows the contact area between the cathode active material and the electrolyte solution to be reduced, and results in sufficient mixing of the first lithium-transition metal composite oxide and the second lithium-transition metal composite oxide. Thus, Examples 1 and 25 to 28 show more improved capacity retention ratio after the 100th cycle in the atmosphere of 50° C. as compared with that of Comparative Examples 5 to 8.

As judged from the above results, it is known that use of the cathode active material, in which the mean particle size of the first lithium-transition metal composite oxide and the second lithium-transition metal composite oxide was adjusted to a range of 2 μm or more to 30 μm or less, in manufacture of the non-aqueous electrolyte secondary battery is successful in improving the charge retention ratio after 100th cycle in the atmosphere of 50° C.

Table 4 shows evaluation results of the initial discharge capacity, the capacity retention ratio after the 100th cycle in the atmosphere of 23° C. and the capacity retention ratio after the 100th cycle in the atmosphere of 50° C. in Examples 1 and 33 to 36 and Comparative Examples 9 to 12. It is to be noted that a first lithium-transition metal composite oxide and second lithium transition metal composite oxide are mixed in a ratio of 50% by weight to 50% by weight.

TABLE 4

| | | Co parts y in first lithium-transition metal composite oxide | Mn parts t in second lithium-transition metal composite oxide | Initial discharge capacity [mAh] | Capacity retention ratio after 100th cycle [%] | |
|---|---|---|---|---|---|---|
| | | | | | 23° C. | 50° C. |
| Example | 1 | 0.25 | 0.3 | 1700 | 95.2 | 84.5 |
| | 33 | 0.05 | 0.3 | 1750 | 91.9 | 82.4 |
| | 34 | 0.5 | 0.3 | 1640 | 96.3 | 85.7 |
| | 35 | 0.25 | 0.05 | 1770 | 93.4 | 83.1 |
| | 36 | 0.25 | 0.5 | 1630 | 96 | 86.3 |
| Comparative Example | 9 | 0.01 | 0.3 | 1810 | 82.2 | 53.9 |
| | 10 | 0.6 | 0.3 | 1310 | 96.8 | 85.1 |
| | 11 | 0.25 | 0.01 | 1820 | 81.7 | 56.8 |
| | 12 | 0.25 | 0.6 | 1290 | 95.8 | 87.2 |

It is known from the evaluation results summarized in Table 4 that Examples 1 and 33 to 36, in which Co parts y in the first lithium-transition metal composite oxide (LiNiCoMO$_2$) and Mn parts t in the second lithium-transition metal composite oxide (LiNiMnMO$_2$) were adjusted to a range of 0.05 or more to 0.50 or less, show more improved capacity retention ratio after the 100th cycle in the atmosphere of 50° C. as compared with that of Comparative Example 9, in which y was less than 0.05 or Comparative Example 11, in which t was less than 0.05.

Comparative Example 9 shows a case where the Co parts y in the first lithium-transition metal composite oxide were adjusted to 0.01, while Comparative Example 11 shows a case where the Mn parts t in the second lithium-transition metal composite oxide were adjusted to 0.01. As described above, Comparative Example 9 or 11 show that adjusting Co parts y in the first lithium-transition metal composite oxide to 0.01, or Mn parts t in the second lithium-transition metal composite oxide to 0.01 renders the crystal structures thereof unstable, and thereby causes deterioration of crystal structure of the cathode active material under repetitive charge/discharge, and also degradation of charge-discharge cycle capacity retention ratio. In particular, the cathode active material causes remarkable degradation of capacity retention ratio after the 100th cycle in the atmosphere of 50° C., because deterioration of the crystal structure is promoted under high temperature environment.

On the contrary, Examples 1 and 33 to 36 show that adjusting Co parts y in the first lithium-transition metal composite oxide and Mn parts t in the second lithium-transition metal compound oxide (LiNiMnMO) to a range of 0.05 or more to 0.50 or less allows the crystal structures of the first lithium-transition metal composite oxide and the second lithium-transition metal composite oxide to be stabled, and thereby achieves excellent charge/discharge cycle capacity retention ratio even under high temperature environment.

It is also known from the evaluation results in Table 4 that Examples 1 and 33 to 36 show larger initial discharge capacity as compared with that of Comparative Example 10, in which Co parts y in the first lithium-transition metal composite oxide (LiNiCoMO) exceed 0.50 or Comparative Example 12, in which Mn parts t in the second lithium-transition metal composite oxide (LiNiMnMO) exceed 0.50.

Comparative Example 10 shows a case where the first lithium-transition metal composite oxide, in which Co parts y were adjusted to 0.60, was used, and Comparative Example 12 shows a case where the second lithium-transition metal composite oxide, in which Mn parts t were adjusted to 0.60, was used. Adjusting Co and Mn parts to more than 0.5 lowers the capacity of the whole cathode active material, and thereby causes lowering of the initial discharge capacity, like Comparative Examples 10 to 12.

On the contrary, Examples 1 and 33 to 36 show that adjusting Co parts y in the first lithium-transition metal composite oxide and Mn parts t in the second lithium-transition metal composite oxide to a range of 0.05 or more to 0.50 or less allows the crystal structure to be stabled, and thereby achieves larger initial discharge capacity.

As judged from the above, it is known that adjusting Co parts in the first lithium-transition metal composite oxide and Mn parts in the second lithium-transition metal composite oxide to a range of 0.05 or more to 0.50 or less in manufacture of the non-aqueous electrolyte secondary battery is successful in raising the initial discharge capacity and in improving the charge/discharge cycle characteristics.

Some embodiments of a lithium ion non-aqueous secondary battery as a second aspect of the present invention will next be described with reference to the accompanying drawings.

Figure 2:
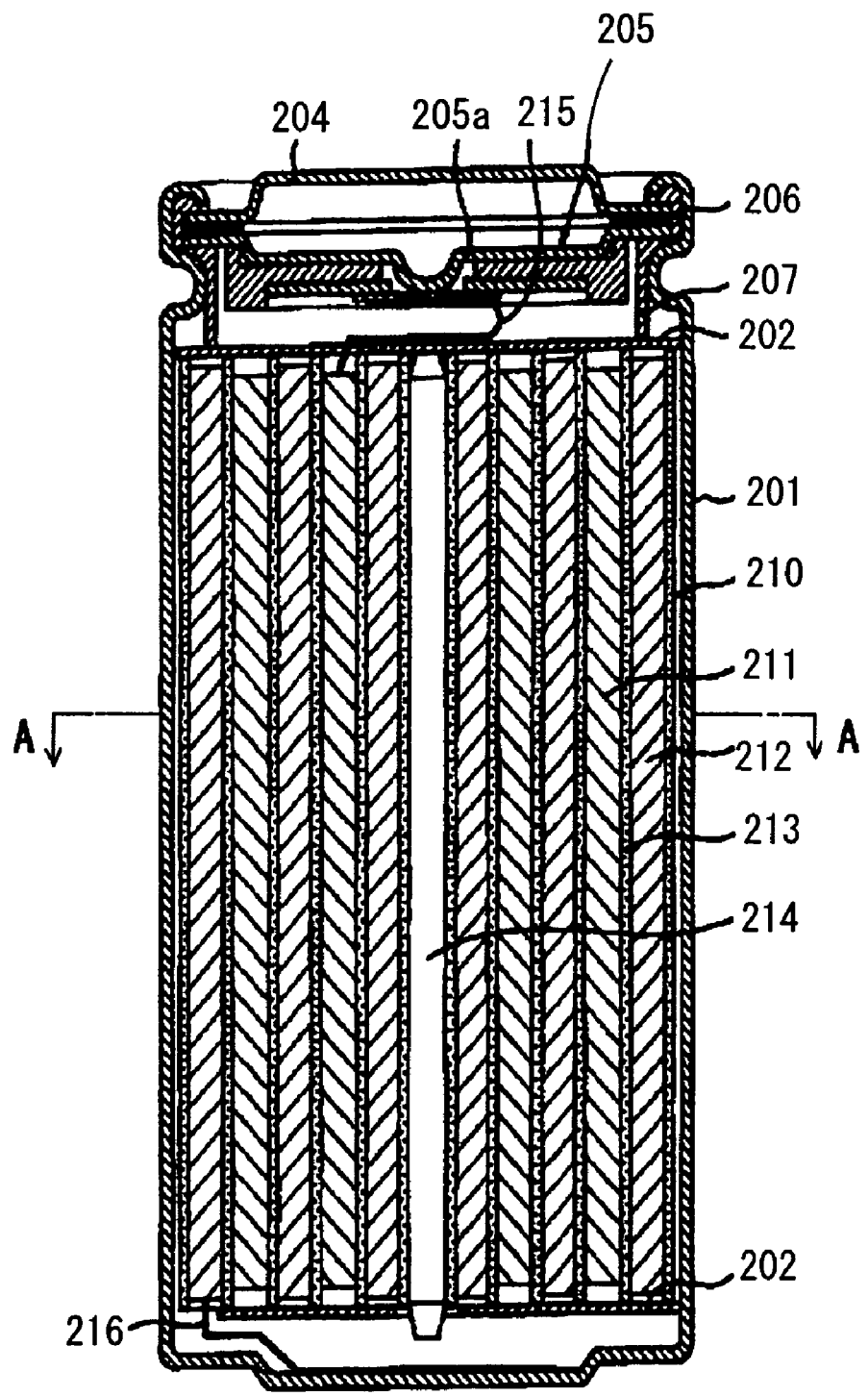
FIG. 2 is a sectional view showing an embodiment of a lithium ion non-aqueous electrolyte secondary battery of the present invention.

FIG. 2 is a sectional view showing an embodiment of the lithium ion non-aqueous electrolyte secondary battery according to the present invention. As shown in FIG. 2, the non-aqueous electrolyte secondary battery is configured so that a spirally wound electrode member 210 obtained by stacking and further spirally rolling up a long strip-shaped cathode 211 and a long strip-shaped anode 212 while placing a separator 213 in between is enclosed, with insulator plates 202 mounted to upper and lower sides of the electrode member, in a battery container 201.

A battery cap 204 is also mounted to the battery container 201 by caulking the battery container while placing a gasket 207 in between. The battery cap 204 is electrically connected to the cathode 211 through a cathode lead 215, and provides functions as a cathode of this battery. Meanwhile, the anode 212 is electrically connected to a bottom of the battery container 201 through an anode lead 216 and configured to allow the battery container 201 to function as an anode of this battery.

Specifically, this battery has a center pin 214 in the center of the spirally wound electrode member 210, and a safety valve 205 having a disk plate 205a and providing current interrupt functions is a safety device for releasing an electrical connection so as to allow a portion electrically connected to the cathode lead 215 to be deformed when a pressure inside the battery is increased.

A thermo-sensitive resistance element 206 placed between the safety valve 205 and the battery cap 204 provides functions as an in-battery element for interrupting a current when a charge/discharge state exceeding a maximum rated current occurs and/or the battery is exposed to high temperature.

Figure 3:
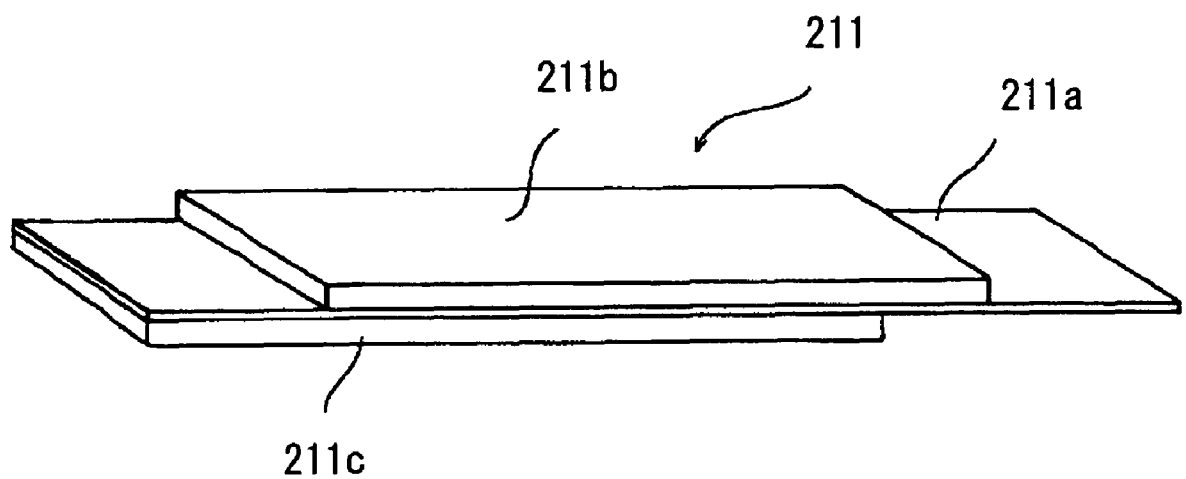
FIG. 3 is a perspective view showing a structure of a long strip-shaped cathode.

FIG. 3 shows a structure of the above long strip-shaped cathode 211. As shown in FIG. 3, the long strip-shaped cathode 211 is configured so that the opposite faces (surface and back surface) of a long strip-shaped cathode current collector 211a are coated with cathode active material compound layers 211b and 211c.

In the non-aqueous electrolyte secondary battery of the present invention, it is preferable to use effectively the inside of the battery so as to increase an energy density of an obtained non-aqueous electrolyte secondary battery by reducing an active material mass irrelevant to a battery reaction, as will be described later, in such a manner as that edges of the cathode active material compound layers 211b and 211c are arranged not to be flush in a longitudinal direction at both or one of the ends of the long strip-shaped cathode 211, as shown in the figure.

Although an anode structure is not shown, the long strip-shaped anode 212 also has the same structure as the long strip-shaped cathode 211, and produces the same effects as the above in such a manner as that edges of the anode active material compound layers coated on the opposite faces of a current collector are arranged not to be flush as viewed from a side face thereof.

While the above compound layer edge treatment of at least one of the cathode and the anode is enough to obtain the above effects, it is also allowable to treat the edges of the compound layers for both of the cathode and the anode.

Figure 4:
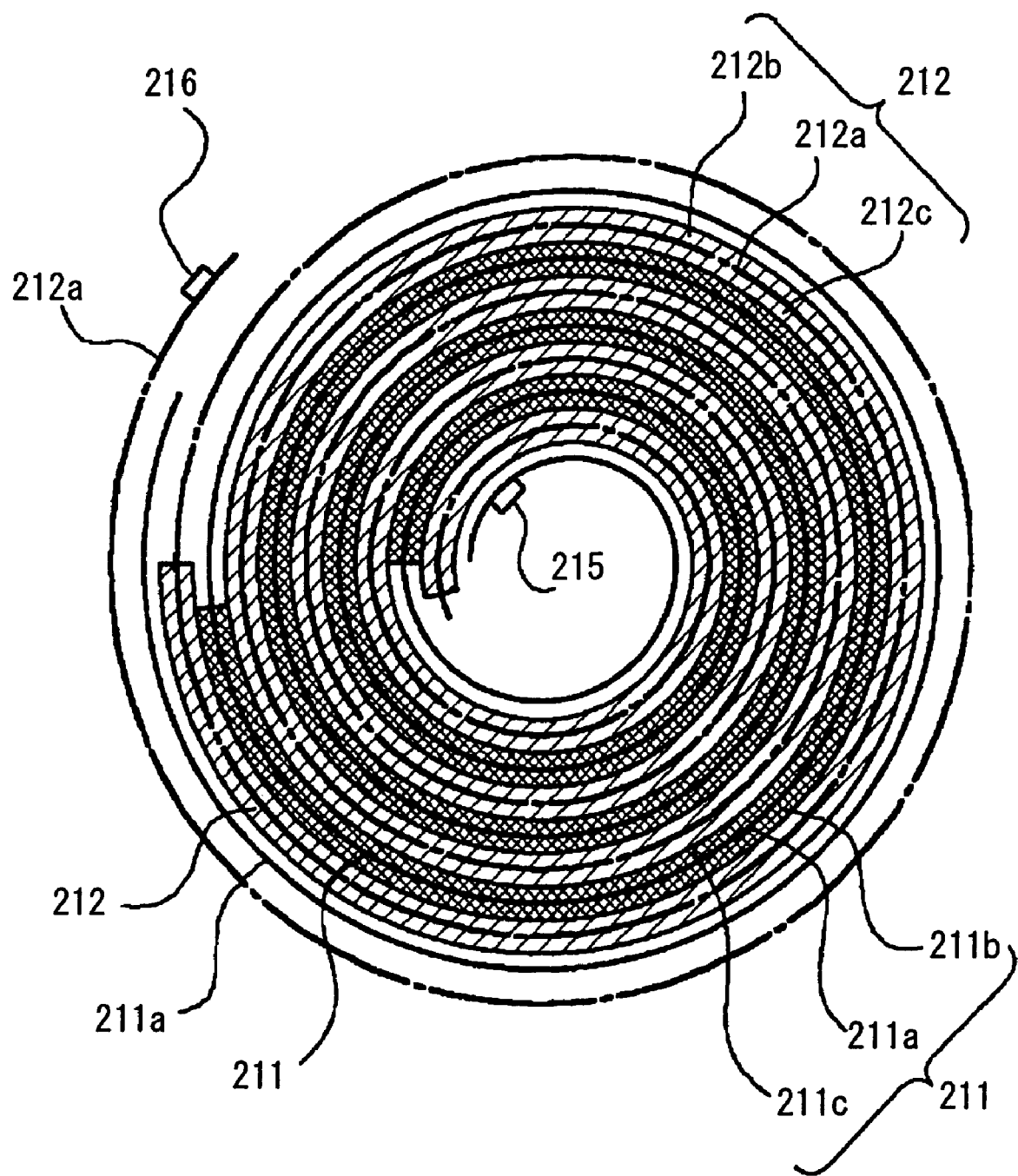
FIG. 4 is a sectional view taken along line A-A in FIG. 2 and showing a spirally wound electrode member.

FIG. 4 is a sectional view taken along line A-A of the non-aqueous electrolyte secondary battery shown in FIG. 2, and there is shown the spirally wound electrode member 210.

In FIG. 4, the spirally wound electrode member 210 is configured so that a four-layer stacked structure obtained by stacking a long strip-shaped anode 212, a separator 213 (not shown), a long strip-shaped cathode 211 and a separator 213 (not shown) in this order is spirally wound up with the long strip-shaped anode 212 placed on the inner side (the center) of the electrode member 210. The long strip-shaped cathode 211 and the long strip-shaped anode 212 are arranged so that the compound layers 211c, 212c are on the inner side (center side) of the spirally wound electrode member 210, while the compound layers 211b, 212b are on the outer side thereof (See FIG. 3).

In thus-configured spirally wound electrode member, a width (height in FIG. 2) and a length (winding-up length), that is, a reaction area of the anode 212 arranged in parallel to the cathode 211 with the separator 213 (not shown) placed in between is set to be greater than a width and a length (reaction area) of the cathode 211 in order to prevent inner short-circuiting caused by deposition of lithium during charging.

Specifically, the spirally wound electrode member shown in the drawing is obtained in a typical winding-up form, in which no treatment is applied to the compound layer edges of the long strip-shaped cathode 211 and the long strip-shaped anode 212 so that the edges of the cathode active material compound layers 211b, 211c and the edges of the anode active material compound layers 212b, 212c are flushed, as viewed from a side face thereof.

Figure 5:
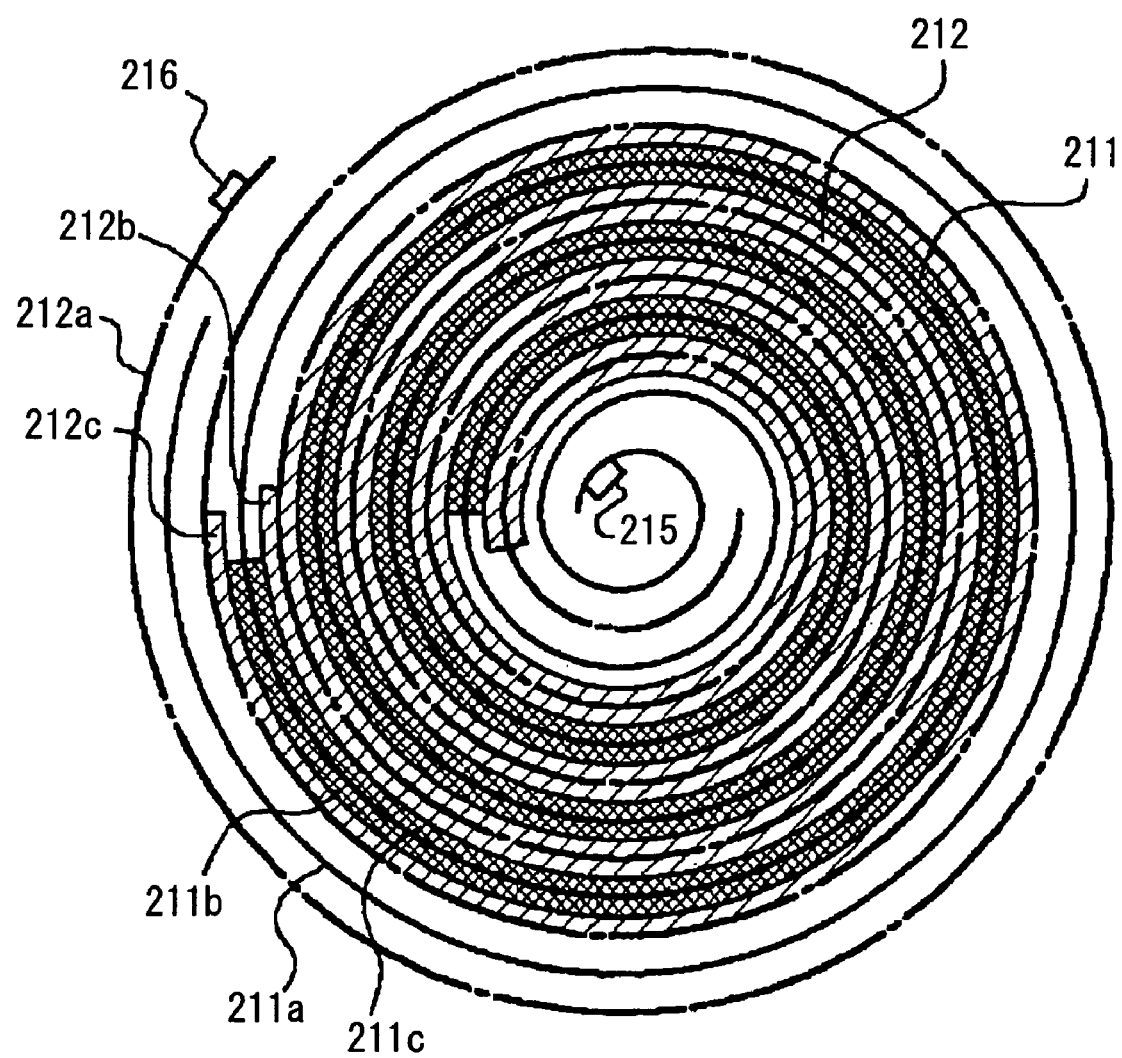
FIG. 5 is a sectional view showing another example of the spirally wound electrode member.

FIG. 5 shows a spirally wound electrode member obtained in a different winding-up form.

The spirally wound electrode member shown in FIG. 5 is configured so that the anode active material compound layer at one end of the long strip-shaped anode 212, specifically, at an end forming the outermost periphery of the spirally wound electrode member is provided on one side only. In other words, the outer periphery of the spirally wound electrode member is provided with only an inner-side compound layer 212c of the anode, and has no outer-side compound layer 212b. It is to be noted that, use of the above winding-up form, in which no treatment is applied to the opposite ends of the long strip-shaped cathode 211 so that the inner-side compound layer 211c and the outer-side compound layer 211b are flushed at the opposite ends of the long strip-shaped cathode 211, makes it possible to allow only a cathode active material compound layer portion and an anode active material compound layer portion, which are actually participating in the battery reaction, to be placed inside the battery, and thereby enables effective use of the inside of the battery so as to increase an energy density of an obtained non-aqueous electrolyte secondary battery.

Figure 6:
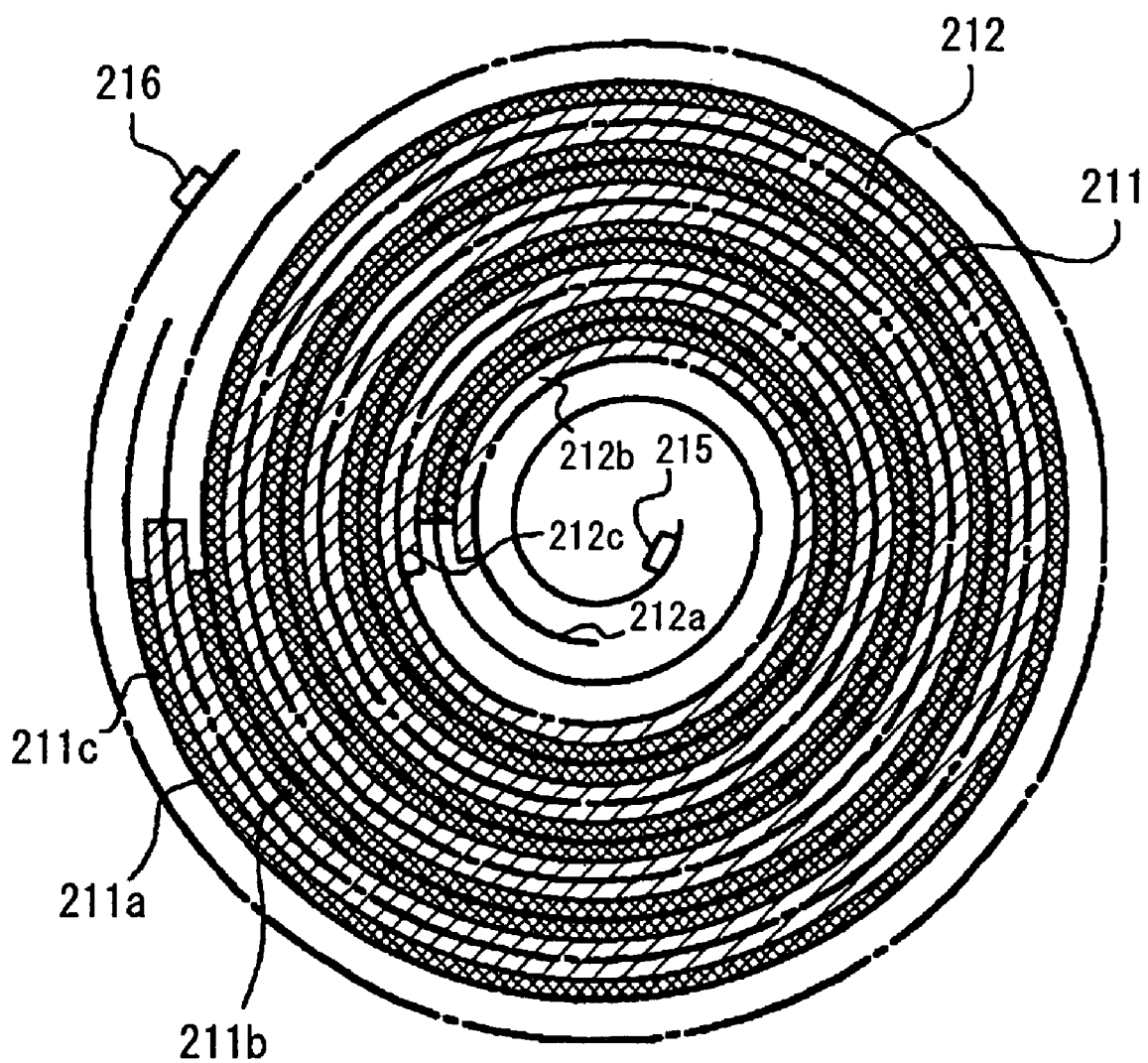
FIG. 6 is a sectional view showing another example of the spirally wound electrode member.

FIG. 6 shows a spirally wound electrode member obtained in a different winding-up form, in which the other end (innermost end) of the long strip-shaped anode 212 is provided with only the outer-side compound layer 212b, and one end (outermost end) of the long strip-shaped cathode 211 is provided with only the inner-side compound layer 211c. It is to be noted that, the compound layers are flushed at one end (outermost end) of the long strip-shaped anode 212 and the other end (innermost end) of the long strip-shaped cathode.

Use of the above winding-up form also enables effective use of the inside of the battery so as to increase an energy density of an obtained battery.

Figure 7:
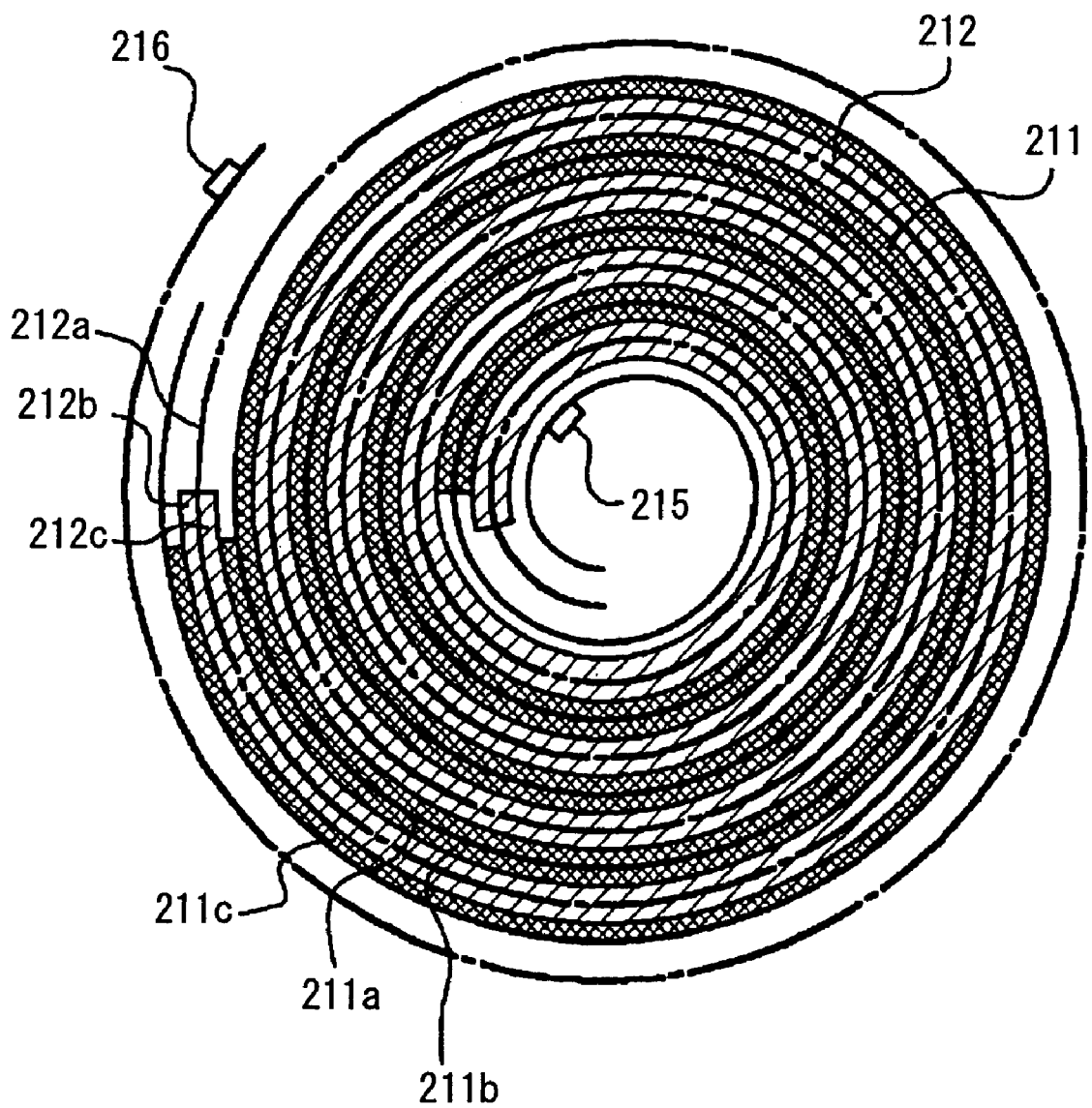
FIG. 7 is a sectional view showing still another example of the spirally wound electrode member.

FIG. 7 shows a spirally wound electrode member obtained in a further different winding-up form, in which one end (outermost end) of the long strip-shaped cathode 211 is provided with only the inner-side compound layer 211c, and the cathode active material compound layers are flushed at the other end (innermost end) of the cathode 211. It is to be noted that, the long strip-shaped anode 212 is configured so that the anode active material compound layers are flushed at the opposite ends of the anode 212.

Figure 8:
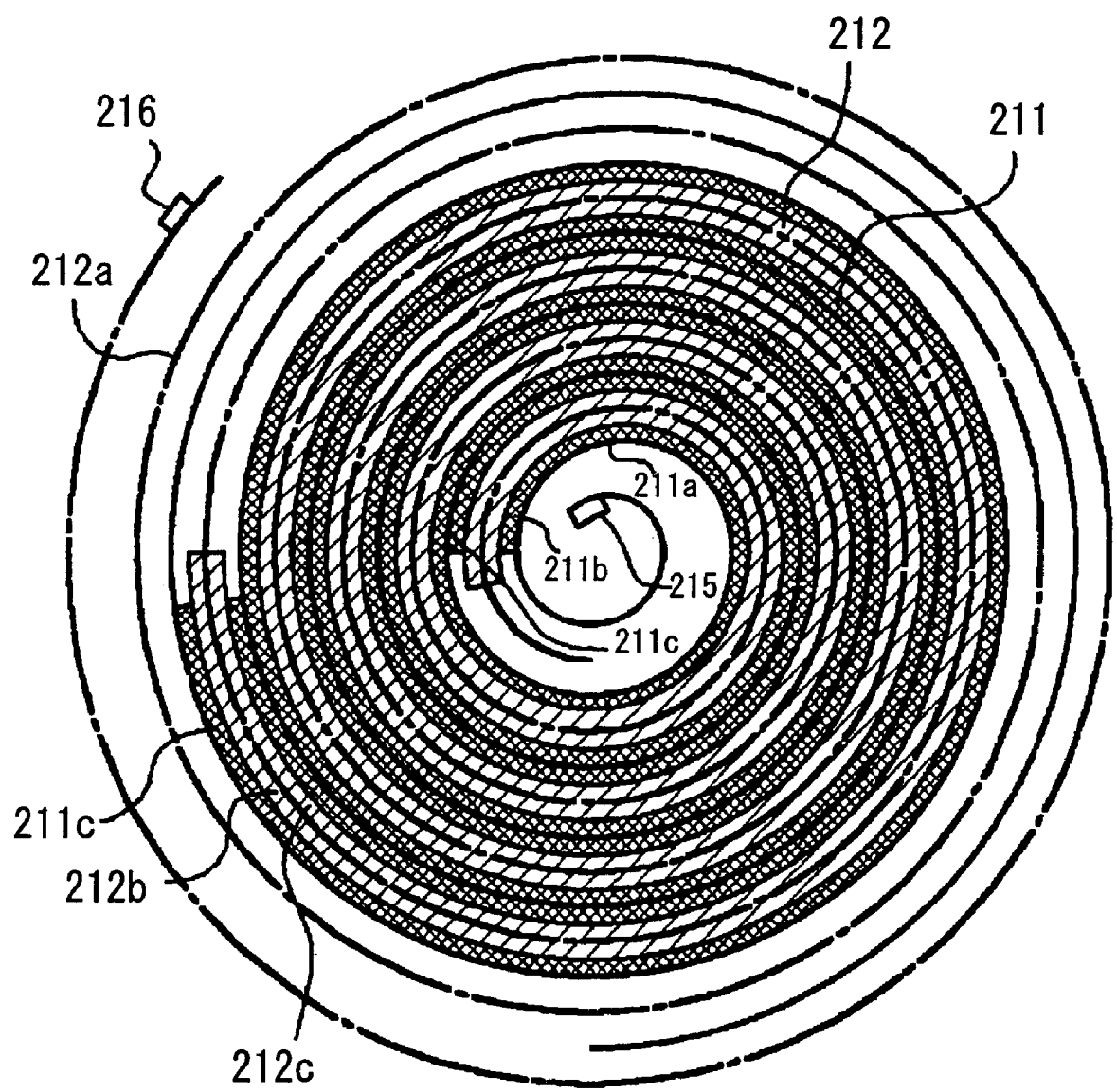
FIG. 8 is a sectional view showing another example of the spirally wound electrode member.

Furthermore, FIG. 8 shows a spirally wound electrode member obtained in a different winding-up form, in which the other end (innermost end) of the long strip-shaped cathode 211 is provided with only the outer-side compound layer 211b, and one end (outermost end) thereof is provided with only the inner-side compound layer 211c. Use of the winding-up form, in which the anode 212 is configured so that the anode active material compound layers are flushed at the opposite ends of the anode 212 as shown in FIGS. 7 and 8, also enables effective use of the inside of the battery so as to increase an energy density of an obtained battery.

While Examples of the present invention will next be described in more detail, the present invention is by no means limited to these Examples.

Example 37

First, how to prepare the cathode active material used in this Example will next be described.

Nickel nitrate, cobalt nitrate and manganese nitrate, which are commercially available materials, were mixed as a solution in a ratio of Ni to Co to Mn of 0.50:0.20:0.30, and added with aqueous ammonia while sufficiently stirring a mixture to prepare a composite hydroxide. The composite hydroxide was added with lithium hydroxide, sintered in an oxygen atmosphere of 850° C. for 10 hours, and pulverized to obtain a lithium-transition metal composite oxide in a powdered form. Analysis of thus-obtained powder was carried out using an atomic absorption spectrometry technology, and results of the analysis confirmed a composition of $LiNi_{0.5}Co_{0.2}Mn_{0.30}O_2$. Measurement of the particle size was also carried out using a laser diffraction technology, and results of the measurement confirmed that the above powder has a mean particle size of 13 μm.

Further, X-ray diffraction measurement of the above powder was carried out, and results of the measurement confirmed that an obtained pattern is similar to a $LiNiO_2$ pattern defined in 09-0063 of ICDD, and also that the above powder exhibits a layer halite structure similar to that of $LiNiO_2$. Observation of the above powder was also carried out using SEM and results of the observation confirmed spherical particles consisting of aggregations of primary grains of 0.1 to 51 μm.

Then, 86% of lithium-transition metal composite oxide thus prepared, 10% of graphite as a conductive material, and 4% of polyvinylidene fluoride ((PVdF) as a binder were mixed, and further added with N-methyl-2-pyrolidone (NMP) to be dispersed therein to prepare a compound material in a slurry form. The slurry-formed compound material was uniformly coated on a long strip-shaped aluminum foil of 20 μm thick, dried, compressed using a roller press machine and then punched out in a predetermined size to obtain a pellet.

Thus-fabricated pellet was used as a cathode, while a lithium foil was used as an anode, and these electrodes were stacked while placing a known porous polyolefin film in between to manufacture a coil cell having a diameter of 20 mm and a height of 1.6 mm.

Herein, for the electrolyte solution, a non-aqueous electrolyte solution was prepared by dissolving $LiPF_6$ in a solution obtained by mixing ethylene carbonate and methyl ethyl carbonate in a volume mixing ratio of 1:1 so as to adjust the concentration thereof to 1 $mol/dm^3$.

Thus-manufactured coin cell was charged up to a point of extraction of 50% of the whole lithium contents, disassembled to take out the pellet, and subjected to XAFS measurement, and XAFS measurement of a non-charged pellet was also carried out. In XAFS measurement, X-ray absorption spectrum was measured using a through transmission technology with Si (111) for dispersive crystal and by scanning between 7960 eV and 9100 eV as X-ray energy.

Figure 9:
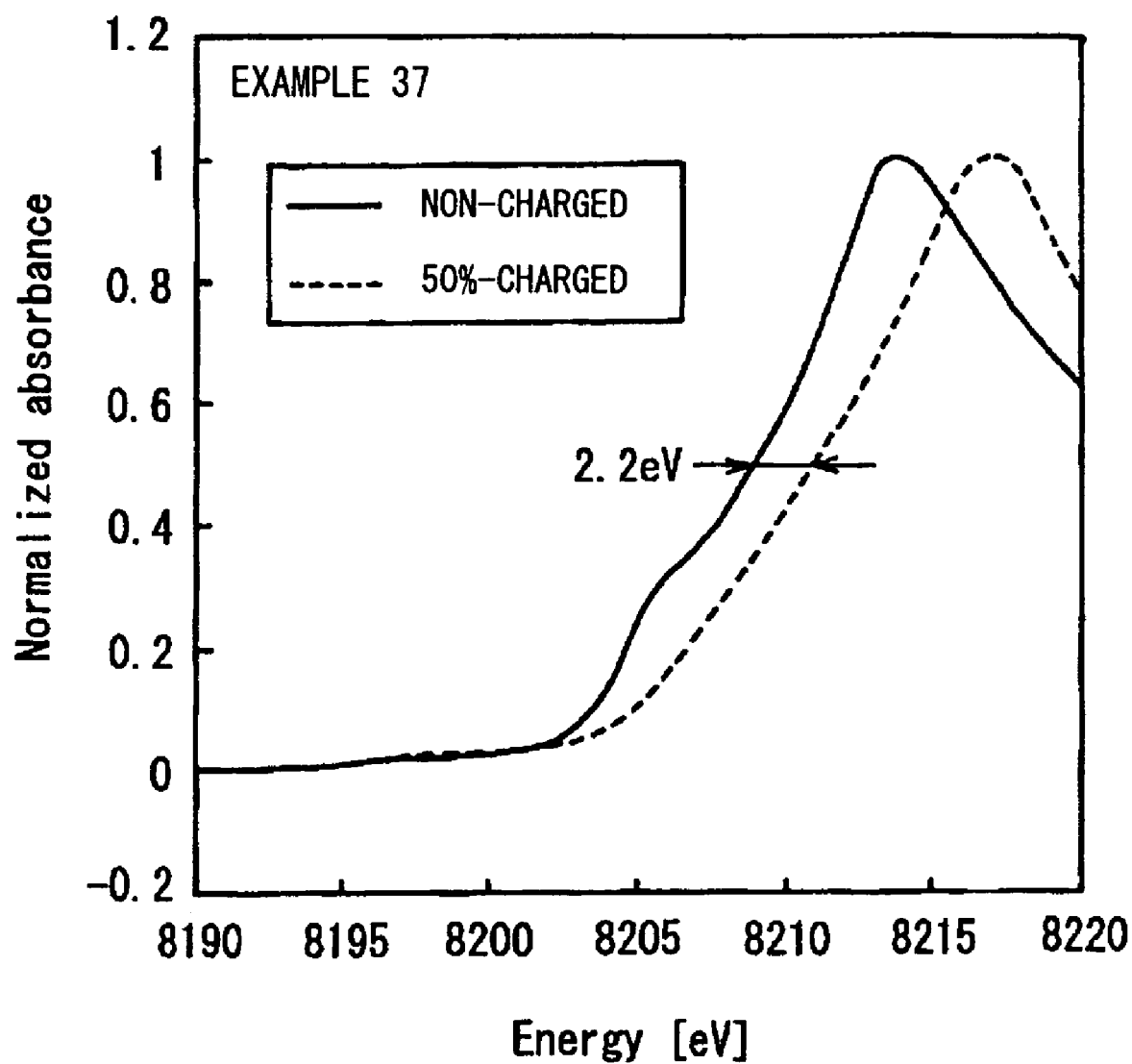
FIG. 9 is a graph showing results of XAFS measurement (Example 37) on a non-charged product and a 50%-charged product.

FIG. 9 shows results of measurement of a non-charged product and a 50%-charged product, in which a range of 8190 eV to 8220 eV of absorption spectrum standardized with jump height of absorption edge as reference after subtraction of a background is shown in an enlarged-scale. When the focus is placed on a position of 0.5 in absorbance, shift of 2.2 eV was observed between the non-charged product and the 50% charged product.

A cylindrical non-aqueous electrolyte secondary battery was manufactured by using the above lithium-transition metal composite oxide for the cathode active material and subjected to evaluation on cycle characteristics under high temperature environment.

Specifically, 86% of cathode active material, 10% of graphite as a conductive material and 4% of polyvinylidene fluoride (PVdF) as a binder were mixed, and further dispersed into N-methyl-2-pyrolidone (NMP) to prepare a cathode compound material of a slurry form. The slurry-formed compound material was uniformly coated on the opposite faces of a long strip-shaped aluminum foil of 20 μm thick, dried, and compressed using a roll press machine to thereby obtain a long strip-shaped cathode.

Next, for an anode, to 90% of artificial graphite in a powdered form was added 10% of PVdF, and further dispersed into NMP to prepare an anode compound material in a slurry form. The slurry-formed compound material was uniformly coated on the opposite faces of a copper foil of 10 μm thick, dried and compressed using a roll press machine to thereby obtain a long strip-shaped anode.

Thus-fabricated long strip-shaped cathode and long strip-shaped anode were spirally wound up a large number of times while placing a porous polyolefin film in between to fabricate a spirally wound electrode member. Thus-fabricated electrode member was enclosed in a battery container made of nickel-plated iron, and insulator plates were mounted to both upper and lower faces of the electrode member.

Then, a cathode lead made of aluminum was extracted from a cathode current collector and welded to a projection part of a safety valve whose electrical connection to the battery cap has been ensured, and an anode lead made of nickel was extracted from an anode current collector and welded to a bottom of the battery container.

Meanwhile, for the electrolyte solution, a non-aqueous electrolyte solution was prepared by dissolving $LiPF_6$ in a solution obtained by mixing ethylene carbonate and methyl ethyl carbonate in a volume mixing ratio of 1:1 so as to adjust the concentration thereof to 1 mol/dm$^3$.

Finally, the electrolyte solution was poured into the battery container with the above electrode member incorporated therein, and the safety valve, the PTC element and the battery cap were fixed by caulking the battery container while placing an insulator sealing gasket in between to thereby manufacture a cylindrical battery having an outer diameter of 18 mm and a height of 65 mm.

Thus-fabricated non-aqueous electrolyte secondary battery was subjected to measurement of initial discharge capacity under conditions that the battery was charged under a voltage of 4.20 V and a current of 1000 mA in an atmosphere of 45° C. for 2.5 hours, and discharged under a current of 800 mA and a cutoff voltage of 2.75 V. Measurement of relative discharge capacity after the 100th cycle was also carried out by repeating the charge/discharge cycle under the same conditions as those for measurement of the initial discharge capacity, so as to calculate a retention ratio to the initial discharge capacity.

Comparative Example 13

A lithium-transition metal composite oxide $LiNi_{0.8}Co_{0.2}O_2$ was prepared by repeating operations similar to those of Example 37, except that a mixing ratio of materials was altered and sintering temperature was set at 750° C.

Figure 10:
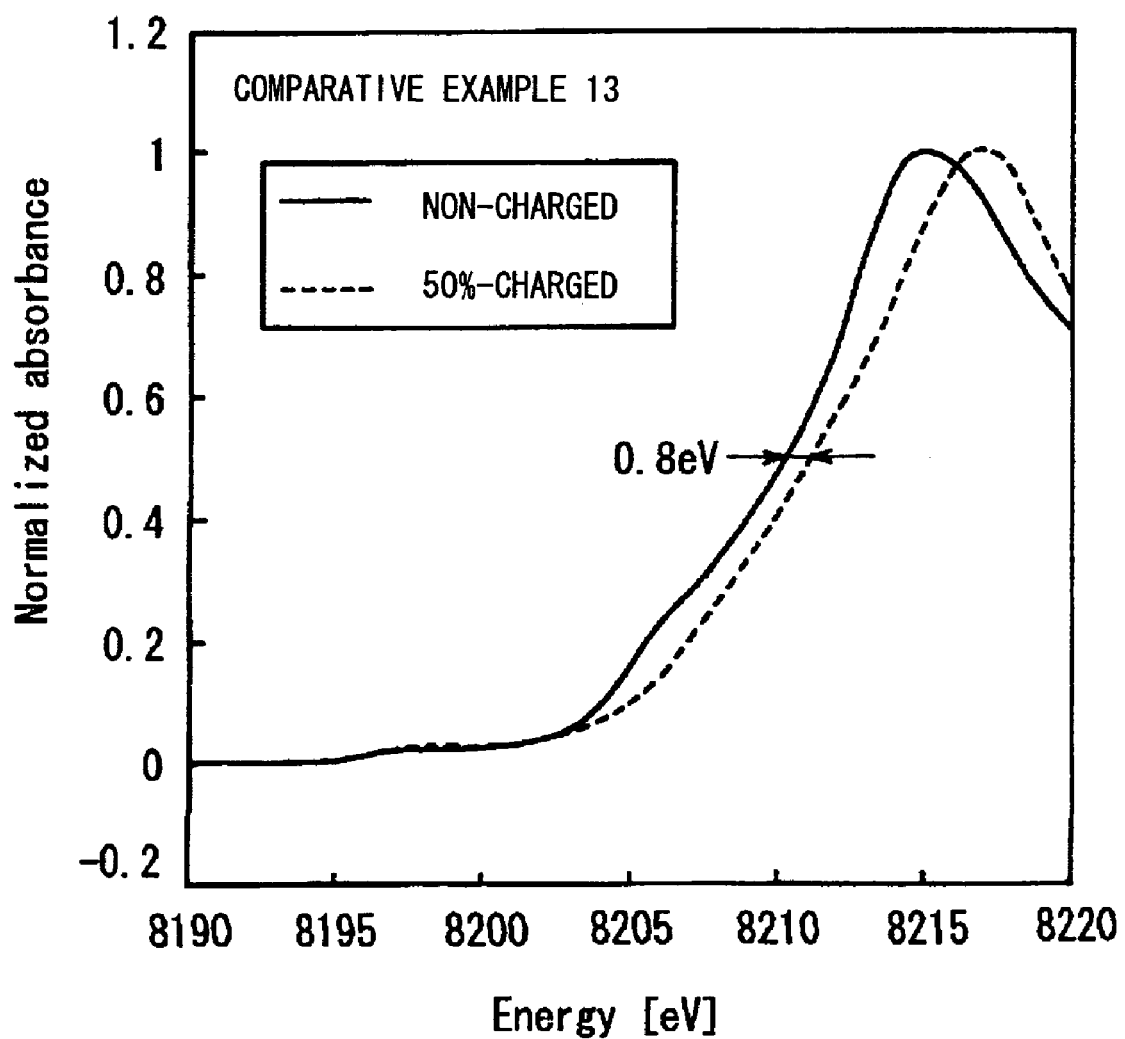
FIG. 10 is a graph showing results of XAFS measurement (Comparative Example 13) on the non-charged product and the 50%-charged product.

The XAFS measurement was carried out similarly, and resulted in a shift width of 0.8 eV, as shown in FIG. 10. Except for using this lithium-transition metal composite oxide, the non-aqueous electrolyte secondary battery was manufactured similarly to Example 37, and a cycle retention ratio in an atmosphere of 45° C. similar to that in Example 37 was evaluated.

Example 38

A lithium-transition metal composite oxide $LiNi_{0.60}Co_{0.20}O_2$ was prepared by repeating operations similar to those of Example 37, except that a mixing ratio of materials was altered.

The XAFS measurement was carried out similarly, and resulted in a shift width of 1.9 eV. Except for using this lithium-transition metal composite oxide, the non-aqueous electrolyte secondary battery was manufactured similarly to Example 37, and a cycle retention ratio in an atmosphere of 45° C. similar to that in Example 37 was evaluated.

Example 39

A lithium-transition metal composite oxide $LiNi_{0.70}Co_{0.20}Ti_{0.10}O_2$ was prepared by repeating operations similar to those of Example 37, except that titanium oxide was used in place of manganese carbonate for materials, a mixing ratio of the materials was altered and sintering temperature was set at 750° C.

The XAFS measurement was carried out similarly and resulted in a shift width of 1.5 eV. Except for using this lithium-transition metal composite oxide, the non-aqueous electrolyte secondary battery was manufactured similarly to Example 37, and a cycle retention ratio in an atmosphere of 45° C. similar to that in Example 37 was evaluated.

Example 40

A lithium-transition metal composite oxide $LiNi_{0.6}Co_{0.20}Mn_{0.10}Ti_{0.10}O_2$ was prepared by repeating operations similar to those of Example 37, except that titanium oxide was further added as materials, and a mixing ratio of the materials was altered.

The XAFS measurement was carried out similarly and resulted in a shift width of 1.8 eV. Except for using this lithium-transition metal composite oxide, the non-aqueous electrolyte secondary battery was manufactured similarly to Example 37, and a cycle retention ratio in an atmosphere of 45° C. similar to that in Example 37 was evaluated.

Example 41

A lithium-transition metal composite oxide $LiNi_{0.80}Co_{0.2}O_2$ was prepared by repeating operations similar to those of Example 37, except that a mixing ratio of materials was altered, and sintering temperature was set at 800° C.

The XAFS measurement was carried out similarly and resulted in a shift width of 1.2 eV. Except for using this lithium-transition metal composite oxide, the non-aqueous electrolyte was manufactured similarly to Example 37, and a cycle retention ratio in an atmosphere of 45° C. similar to that in Example 37 was evaluated.

Example 42

A lithium-transition metal composite oxide $LiNi_{0.60}Co_{0.40}O_2$ was prepared by repeating operations similar to those of Example 37, except that a mixing ratio of materials was altered and sintering temperature was set at 750° C.

The XAFS measurement was carried out similarly and resulted in a shift width of 1.3 eV. Except for using this lithium-transition metal composite oxide, the non-aqueous electrolyte secondary battery was manufactured similarly to Example 37, and a cycle retention ratio in an atmosphere of 45° C. similar to that in Example 37 was evaluated.

Example 43

A lithium-transition metal composite oxide $LiNi_{0.80}Co_{0.20}O_2$ was prepared by repeating operations similar to those of Example 37, except that a mixing ratio of materials was altered, sintering temperature was set at 750° C., and an atmosphere in sintering was changed from oxygen to air.

The XAFS measurement was carried out similarly and resulted in a shift width of 1.4 eV.

Except for using this lithium-transition metal composite oxide, the non-aqueous electrolyte secondary battery was manufactured similarly to Example 37, and a cycle retention ratio in an atmosphere of 45° C. similar to that in Example 37 was evaluated.

Comparative Example 14

A lithium-transition metal composite oxide $LiNi_{0.85}Co_{0.10}Al_{0.05}O_2$ was prepared by repeating operations similar to those of Example 37, except that a mixing ratio of materials was altered, and sintering temperature was set at 750° C.

The XAFS measurement was carried out similarly and resulted in a shift width of 0.7 eV. Except for using this lithium-transition metal composite oxide, the non-aqueous electrolyte secondary battery was manufactured similarly to Example 37, and a cycle retention ratio in an atmosphere of 45° C. similar to that in Example 37 was evaluated.

TABLE 5

|  |  | Composition | Synthesis conditions | | Shift width [eV] | Capacity retention ratio (%) |
| --- | --- | --- | --- | --- | --- | --- |
|  |  |  | Temperature | Atmosphere |  |  |
| Example | 37 | $LiNi_{0.50}Co_{0.20}Mn_{0.3}O_2$ | 850° C. | Oxygen | 2.2 | 92.4 |
|  | 38 | $LiNi_{0.6}Co_{0.2}Mn_{0.2}O_2$ | 850° C. | Oxygen | 1.9 | 91 |
|  | 39 | $LiM_{0.70}Co_{0.20}Ti_{0.20}O_2$ | 750° C. | Oxygen | 1.5 | 90 |
|  | 40 | $LiNi_{0.60}Co_{0.20}Mn_{0.1}Ti_{0.10}O_2$ | 850° C. | Oxygen | 1.8 | 91.1 |
|  | 41 | $LiNi_{0.80}Co_{0.20}O_2$ | 800° C. | Oxygen | 1.2 | 85.6 |
|  | 42 | $LiNi_{0.60}Co_{0.40}O_2$ | 750° C. | Oxygen | 1.3 | 86.4 |
|  | 43 | $LiNi_{0.80}Co_{0.20}O_2$ | 750° C. | Air | 1.4 | 86.8 |
| Comparative | 13 | $LiNi_{0.80}Co_{0.20}O_2$ | 750° C. | Oxygen | 0.8 | 71.9 |
| Example | 14 | $LiNi_{0.85}Co_{0.10}A_{0.05}O_2$ | 750° C. | Oxygen | 0.7 | 70.3 |

As judged from the above results, it was confirmed that regulating a shift width to 1.0 eV or more results in great improvement of cycle characteristics under high temperature environment. It was also confirmed that adding at least one element selected from Mn and Ti increases a shift width in particular, and results in further improvement of cycle characteristics under high temperature environment.

While the present invention has been described in detail with reference to some preferred embodiments, it is to be understood that the present invention is by no means limited to the above embodiments, and various modifications are possible without departing from the spirit and scope of the present invention. In other words, means for embodying the present invention is not limited in particular, and the present invention may be also embodied based on investigations of synthesis conditions in synthesizing the lithium-transition metal composite oxide, use of different species of elements as additives and parts of components, for instance.

Next, some embodiments of a lithium ion non-aqueous electrolyte secondary battery of the present invention will be specifically described with reference to the accompanying drawings.

Figure 11:
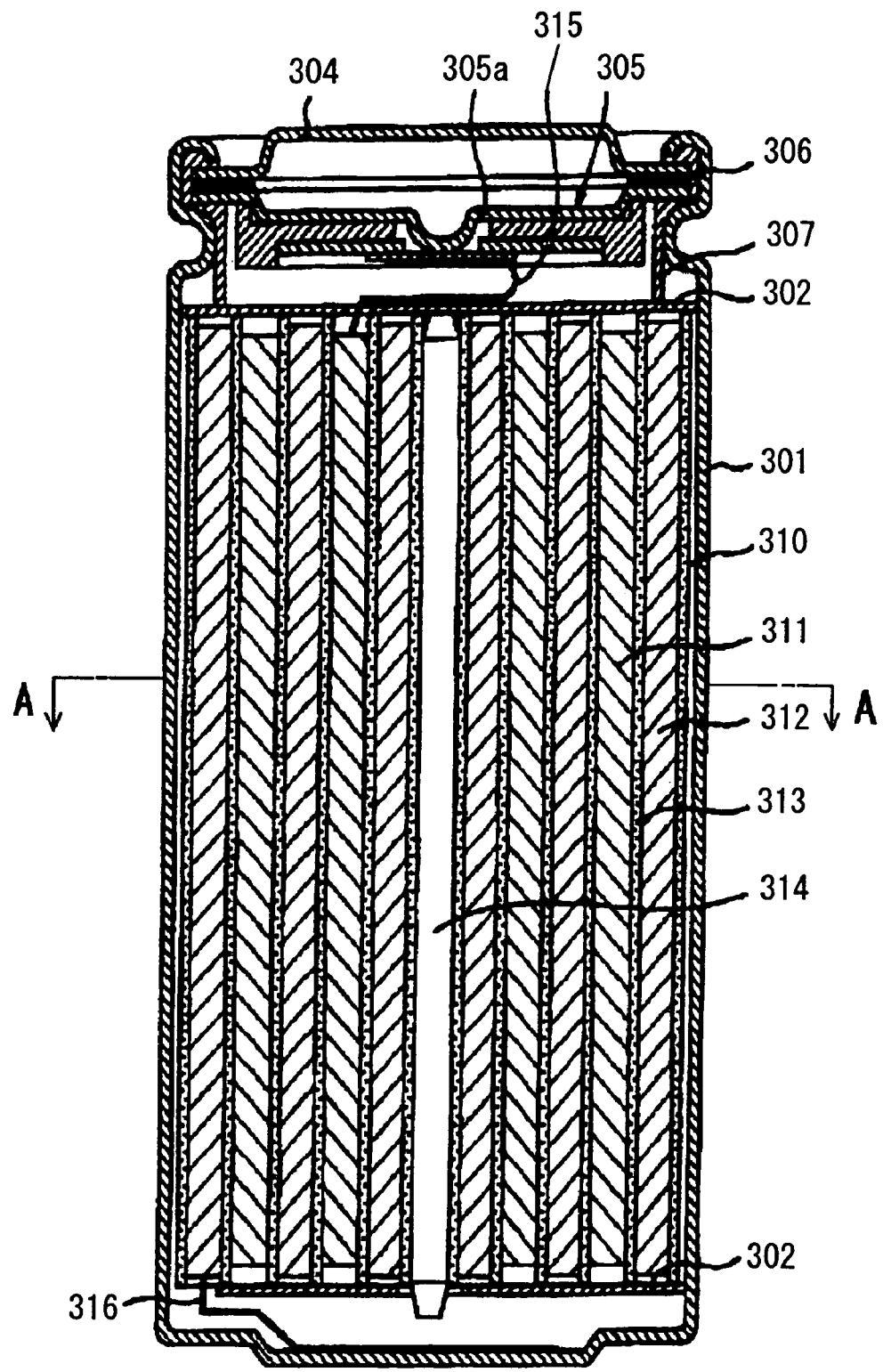
FIG. 11 is a sectional view showing an embodiment of a lithium ion non-aqueous electrolyte secondary battery of the present invention.

FIG. 11 is a sectional view showing an embodiment of a lithium ion non-aqueous electrolyte secondary battery of the present invention. As shown in FIG. 11, the non-aqueous electrolyte secondary battery is configured so that a spirally wound electrode member 310 obtained by stacking and further spirally rolling up a long strip-shaped cathode 311 and a long strip-shaped anode 312 while placing a separator 313 in between is enclosed, with insulator plates 302 mounted to upper and lower sides of the electrode member, in a battery container 301.

A battery cap 304 is also mounted to the battery container 301 by caulking the battery container while placing a gasket 307 in between. The battery cap 304 is electrically connected to the cathode 311 through a cathode lead 315 and provides functions as a cathode of this battery. Meanwhile, the anode 312 is electrically connected to a bottom of the battery container 301 through an anode lead 316, and configured to allow the battery container 301 to function as an anode of this battery.

Specifically, this battery has a center pin 314 in the center of the spirally wound electrode member 310, and a safety valve 305 providing current interrupt functions and having a disk plate 305a is a safety device for releasing an electrical connection so as to allow a portion electrically connected to the cathode lead 315 to be deformed when a pressure inside the battery is increased.

A thermo-sensitive resistance element 306 placed between the safety valve 305 and the battery cap 304 provides functions as an in-battery element for interrupting a current when a charge/discharge state exceeding a maximum rated current occurs and/or the battery is exposed to high temperature.

Figure 12:
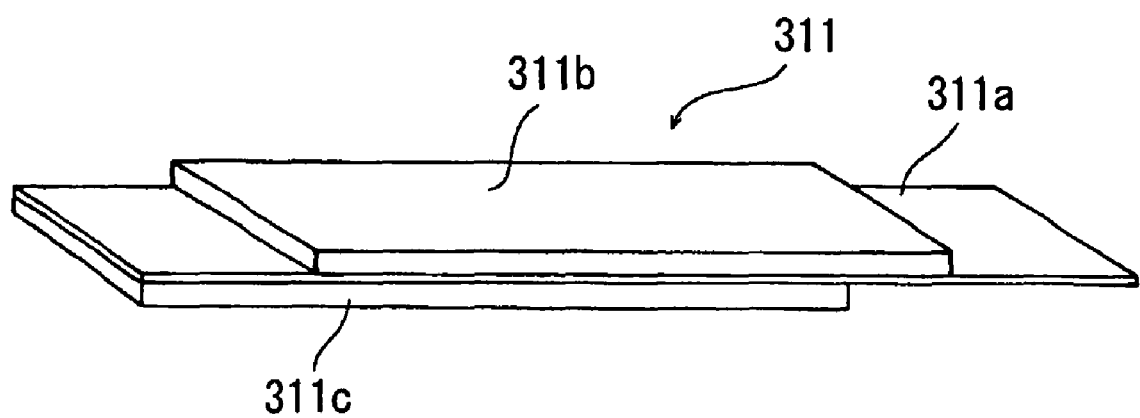
FIG. 12 is a perspective view showing a structure of a long strip-shaped cathode.

FIG. 12 shows a structure of the above long strip-shaped cathode 311. As shown in FIG. 12, the long strip-shaped cathode 311 is configured so that the opposite faces (surface and back surface) of a long strip-shaped cathode current collector 311a are coated with cathode active material compound layers 311b and 311c.

As shown in the drawing, in the non-aqueous electrolyte secondary battery of the present invention, it is preferable to effectively use the inside of the battery so as to increase an energy density of an obtained non-aqueous electrolyte secondary battery by reducing an active material mass irrelevant to a battery reaction in such a manner as that edges of the cathode active material compound layers 311b and 311c are arranged to be irregular in a longitudinal direction of both or one of the ends of the long strip-shaped cathode 311, as will be described later.

Although an anode structure is not shown, the long strip-shaped anode 312 also has the same structure as the long strip-shaped cathode 311, and produces the same effects as the above in such a manner as that edges of the anode active material compound layers coated on the opposite faces of a current collector are arranged not to be flush as viewed from a side face thereof, like the arrangement of the cathode.

It is to be noted that, while the above compound layer edge treatment of at least one of the cathode and the anode is enough to obtain the above effects, it is also allowable to treat the edges of the compound U layers for both of the cathode and the anode.

Figure 13:
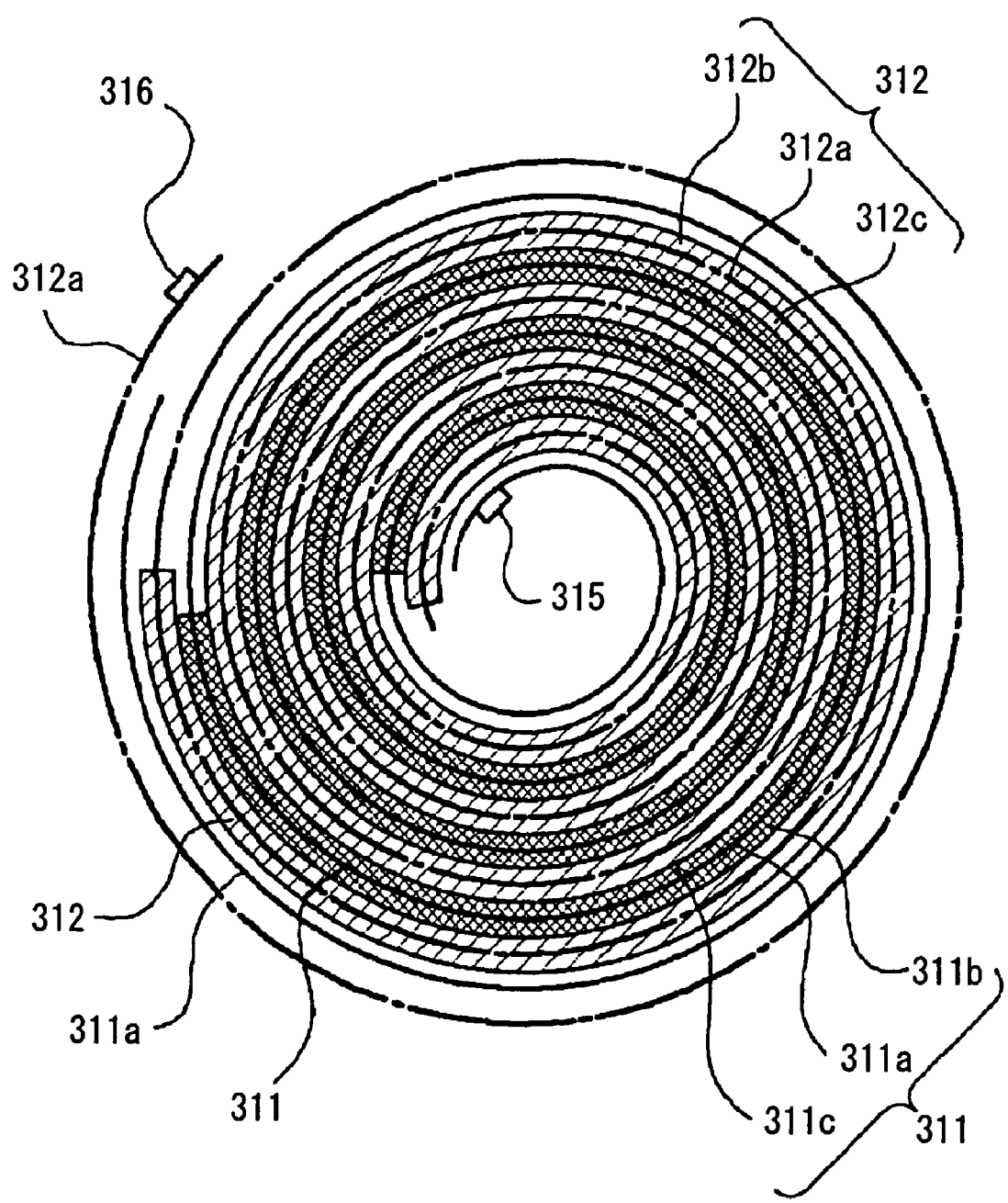
FIG. 13 is a sectional view taken along line A-A in FIG. 11 and showing a spirally wound electrode member.

FIG. 13 is a sectional view taken along line A-A of the non-aqueous electrolyte secondary battery shown in FIG. 11, and the spirally wound electrode member 310 is shown.

In FIG. 13, the spirally wound electrode member 310 is configured so that a four-layer stacked structure obtained by stacking a long strip-shaped anode 312, a separator 313 (not shown), a long strip-shaped cathode 311 and a separator 313 (not shown) is spirally wound up with the long strip-shaped anode 312 placed on the inner side (center portion) of the electrode member 310 in this order. The long strip-shaped cathode 311 and the long strip-shaped anode 312 are arranged so that the compound layers 311c and 312c thereof are on the inner side (center side) of the spirally wound electrode member 310, while the compound layers 311b and 312b thereof are on the outer side thereof (See FIG. 12).

In general, in thus-configured spirally wound electrode member, a width (height in FIG. 11) and a length (winding-up length), that is, a reaction area of the anode 312 arranged in parallel to the cathode 311 while placing the separator 313 (not shown) in between is set so as to be greater than a width and a length (reaction area) of the cathode 311 in order to prevent inside short-circuiting caused by deposition of lithium during charging.

It is to be noted that, the spirally wound electrode member shown in the drawing is obtained in a typical winding-up form, in which no treatment is applied to the compound layer edges of the long strip-shaped cathode 311 and the long strip-shaped anode 312 so that the edges of the cathode active material compound layers 311b, 311c and edges of the anode active material compound layers 312b, 312c are flushed, as viewed from a side face thereof.

Figure 14:
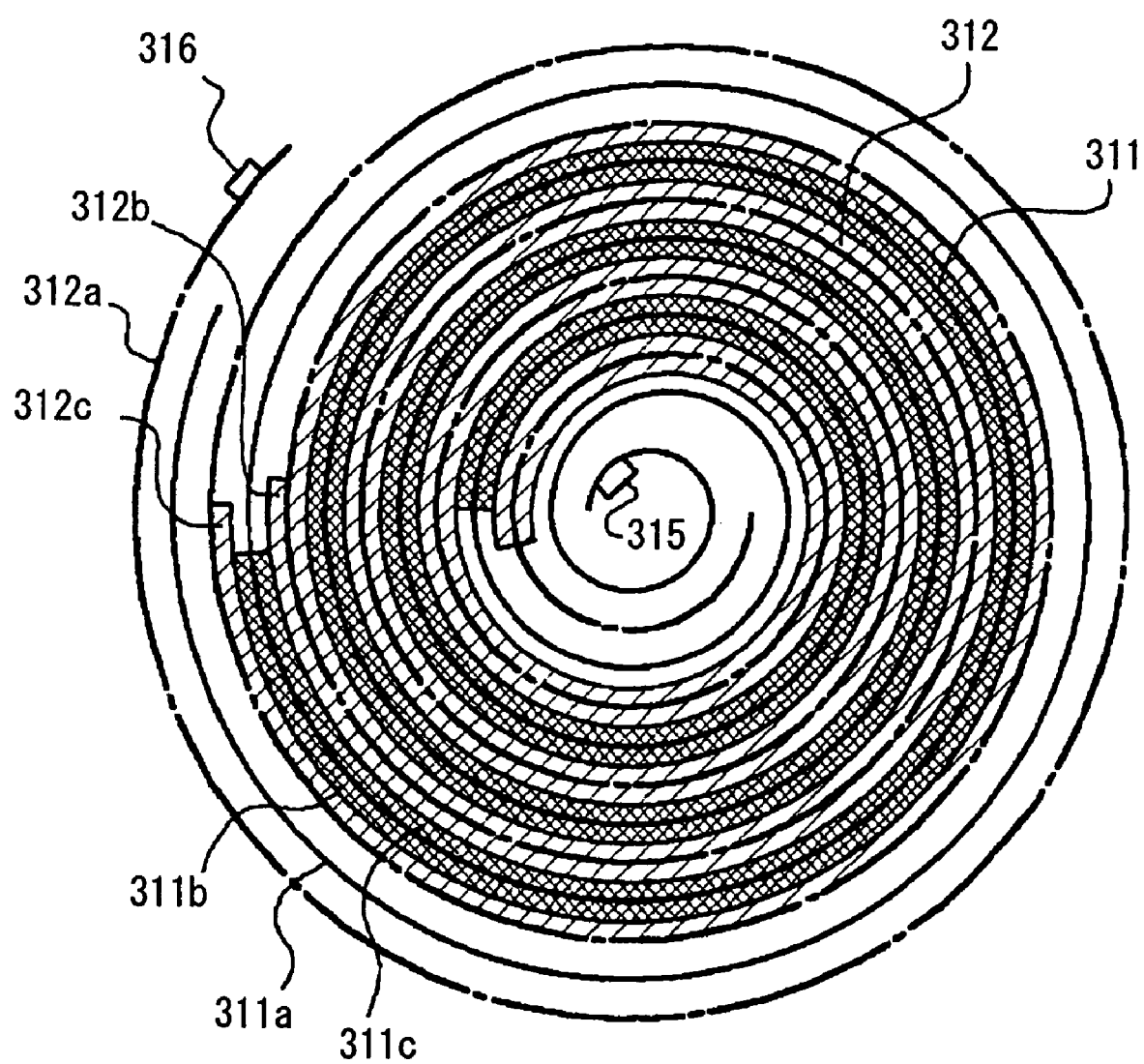
FIG. 14 is a sectional view showing another example of the spirally wound electrode member.

FIG. 14 shows a spirally wound electrode member obtained in a different winding-up form.

The spirally wound electrode member shown in FIG. 14 is configured so that the anode active material compound layer at one end of the long strip-shaped anode 312, that is, at an end forming the outermost periphery of the spirally wound electrode member is provided on one side only. In other words, the outermost periphery of the spirally wound electrode member is provided with only an inner-side compound layer 312c of the anode, and has no outer-side compound layer 312b. Incidentally, use of the above winding-up form, in which no treatment is applied to the opposite ends of the long strip-shaped cathode 311 so that the inner-side compound layer 311c and the outer-side compound layer 311b are flushed at the opposite ends of the cathode, allows only a cathode active material compound layer portion and an anode active material compound layer portion, which are actually participating in the battery reaction, to be placed on the inside of the battery, and thereby enables effective use of the inside of the battery so as to increase an energy density of an obtained non-aqueous electrolyte secondary battery.

Figure 15:
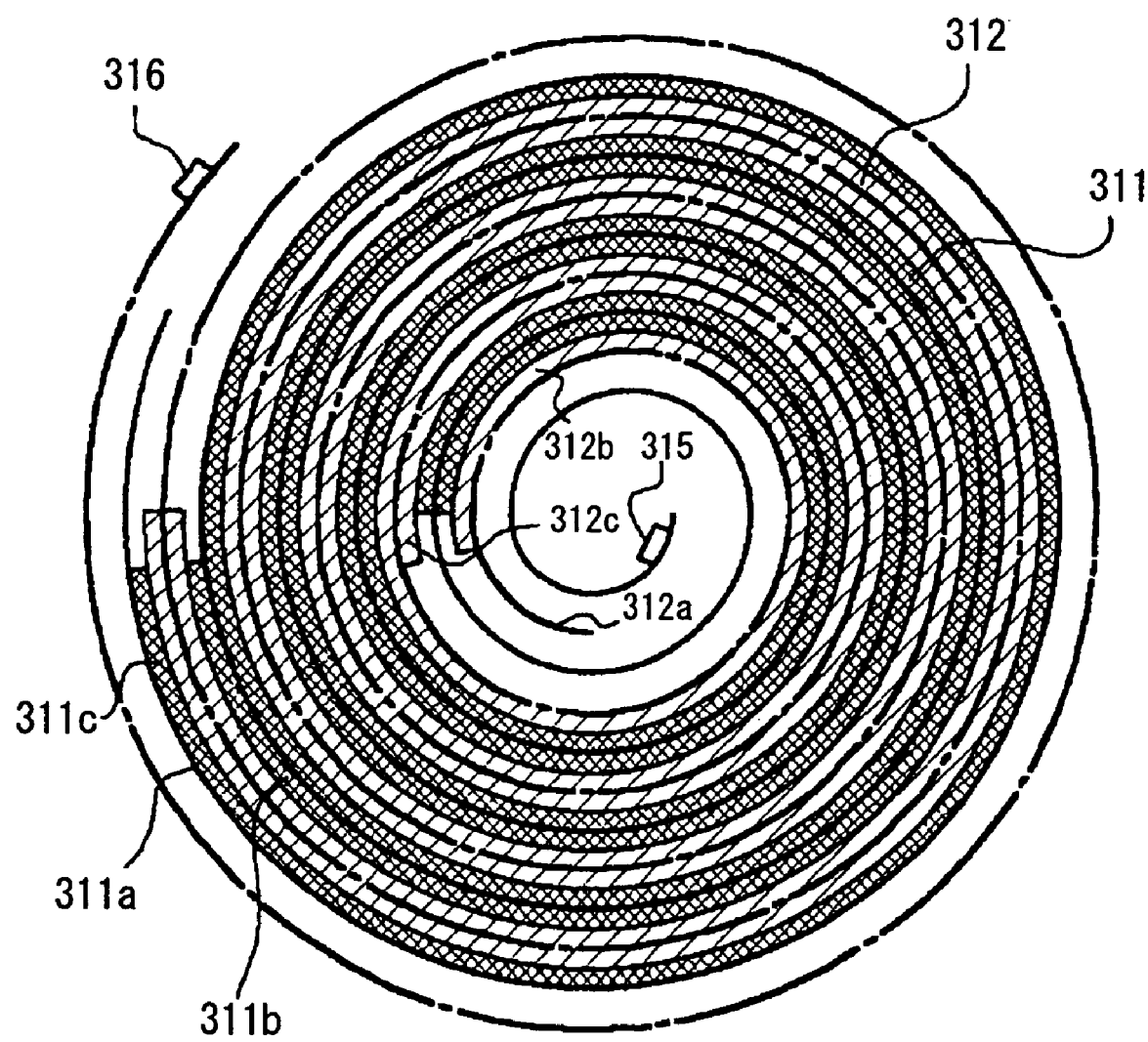
FIG. 15 is a sectional view showing another example of the spirally wound electrode member.

FIG. 15 shows a spirally wound electrode member obtained in a different winding-up form, in which the other end (innermost end) of the long strip-shaped anode 312 is provided with only the outer-side compound layer 312b, and one end (outermost end) of the long strip-shaped cathode 311 is provided with only the inner-side compound layer 311c. Incidentally, the compound layers are flushed at one end (outermost end) of the long strip-shaped anode 312 and the other end (innermost end) of the long strip-shaped cathode.

Use of the above winding-up form also enables effective use of the inside of the battery similarly to the above so as to increase an energy density of an obtained battery.

Figure 16:
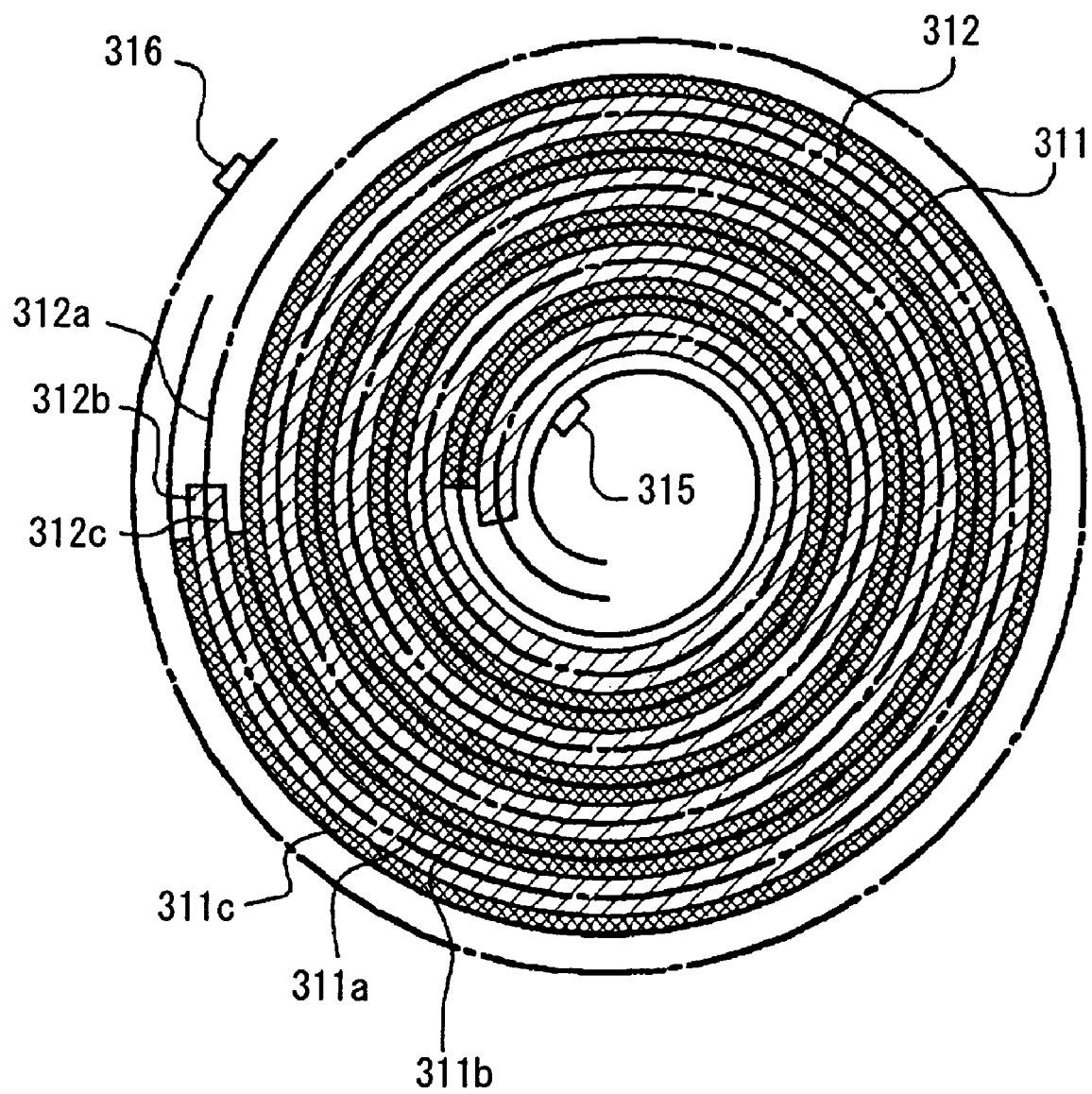
FIG. 16 is a sectional view showing still another example of the spirally wound electrode member.

FIG. 16 shows a battery obtained in a further different winding-up form, in which one end (outermost end) of the long strip-shaped cathode 311 is provided with only the inner-side compound layer 311c, and the cathode active material compound layers are flushed at the other end (innermost end) of the cathode.

It is to be noted that the long strip-shaped anode 312 is configured so that anode active material compound layers are flushed at the opposite ends of the anode.

Figure 17:
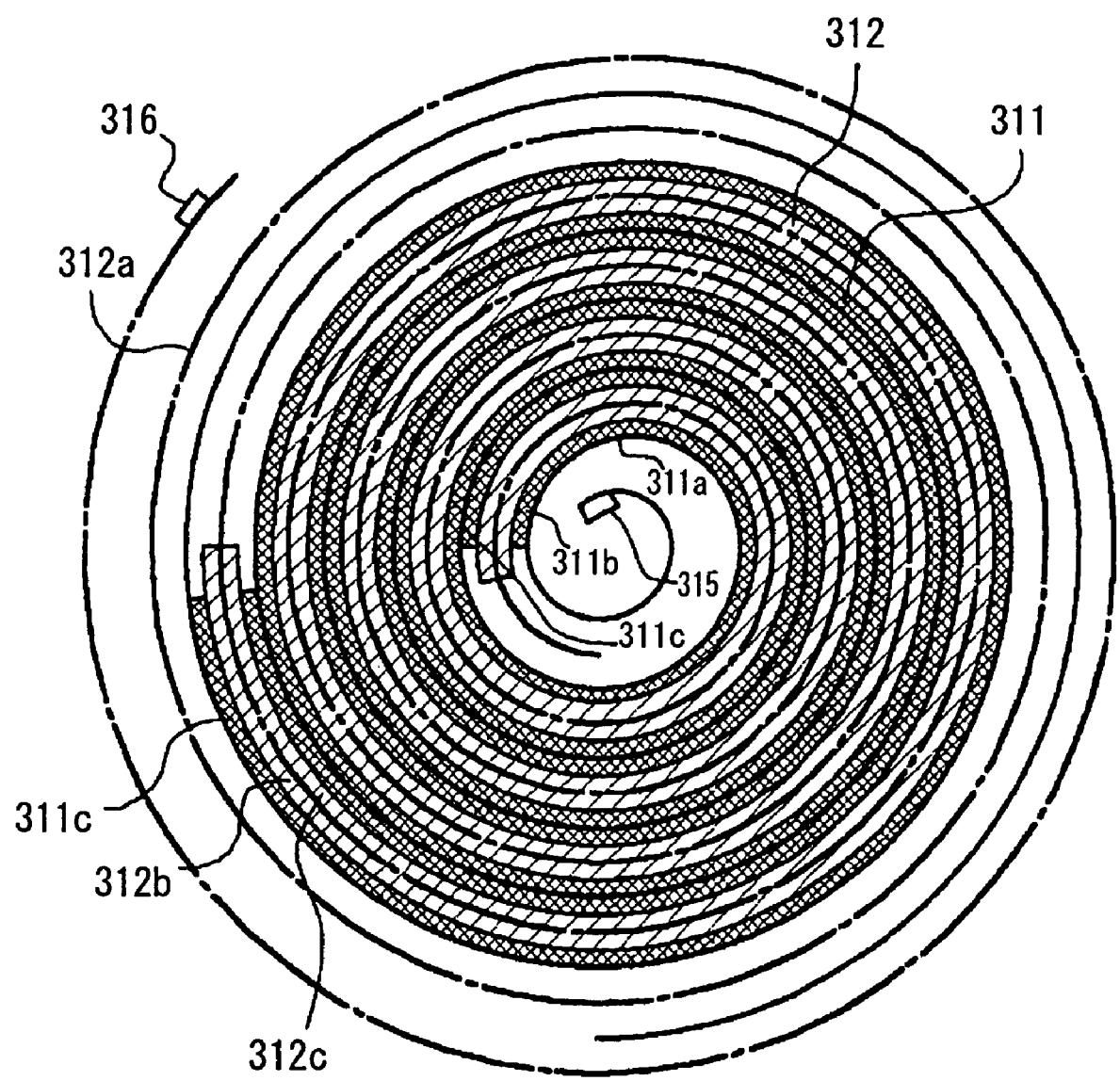
FIG. 17 is a sectional view showing another example of the spirally wound electrode member.

Furthermore, FIG. 17 shows a spirally wound electrode member obtained in a different winding-up form, in which the other end (innermost end) of the long strip-shaped cathode 311 is provided with only the outer-side compound layer 311b, and one end (outermost end) thereof is provided with only the inner-side compound layer 311c. Use of the winding-up form, in which the long strip-shaped anode 312 is configured so that the anode active material compound layers are flushed at the opposite ends of the anode 312 as shown in FIGS. 16 and 17, also enables effective use of the inside of the battery similarly to the above so as to increase an energy density of an obtained battery.

EXAMPLES

While the present invention will be next described specifically on the basis of Examples and Comparative Examples, it is to be understood that the present invention is by no means limited to these Examples. Incidentally, a cylindrical battery was manufactured and subjected to evaluation on over-discharge resistance of a secondary battery using the cathode active material of the present invention.

Example 44

(1) Preparation of First Lithium-Transition Metal Composite Oxide A

Cobalt oxide and lithium carbonate, which are commercially available materials, were mixed so that a molar ratio of Li to Co becomes 1.02:1.00, and a mixture was put into a crucible made of alumina, and sintered in an atmosphere of dried air. Quantitative analysis of thus-obtained powder was carried out using an atomic absorption spectrometry technology, and results of the analysis confirmed a composition of $LiCoO_2$. Also, measurement of a particle size was carried out using a laser diffraction technology, and results of the measurement confirmed that the above powder has a mean particle size of 15 μm. Further, X-ray diffraction measurement of the above powder was carried out, and results of the measurement confirmed that an obtained diffraction pattern is similar to a $LiCoO$=pattern defined in 36-1004 of International Center for Diffraction Data (which will be referred simply to as ICDD) and also that the above powder exhibits a layer structure similar to that of $LiCoO_2$.

Then, 86% of lithium-transition metal composite oxide A thus-prepared, 10% of graphite as a conductive material and 4% of polyvinylidene fluoride (which will be simply referred to as "PVdF") as a binder were mixed and further dispersed into N-methyl-2-pyrrolidone (which will be simply referred to as "NMP") to obtain a compound material in a slurry form. The slurry-formed compound material was uniformly coated on a long strip-shaped aluminum foil of 20 μm thick, dried, compressed using a roll press machine and punched out in a predetermined size to thereby obtain a pellet. The pellet was used as a cathode, while a lithium foil was used as an anode, and these electrodes were stacked while placing a known porous polyolefin film in between to thereby manufacture a coil cell having a diameter of 20 mm and a height of 1.6 mm. For the electrolyte solution, a non-aqueous electrolyte solution was prepared by dissolving $LiPF_6$ in a solution obtained by mixing ethylene carbonate and methyl ethyl carbonate in a volume mixing ratio of 1:1 so as to adjust the concentration thereof to 1 $mol/dm^3$.

Then, thus-fabricated coil cell was charged up to 4.250 V, then discharged under a constant current of 0.2 C down to 3.000 V, and resulted in a mean discharge voltage of 3.948 V.

(2) Preparation of Second Lithium-Transition Metal Composite Oxide B

Nickel nitrate, cobalt nitrate and manganese nitrate, which are commercially available materials, were mixed so as to have a solution in a molar ratio of Ni to Co to Mn of 0.60: 0.20:0.20, and further added with aqueous ammonium drops while sufficiently stirring a mixture to prepare a composite hydroxide. The composite hydroxide was mixed with lithium hydroxide, sintered in an atmosphere of oxygen at 800° C. for 10 hours, and pulverized to thereby prepare a lithium-transition metal composite oxide B in a powdered form. Analysis of thus-obtained powder was carried out using an atomic absorption spectrometry technology, and results of the analysis confirmed a composition of $LiNi_{0.5}Co_{0.2}Mn_{0.3}O_2$. Measurement of a particle size was also carried out using a laser diffraction technology, and results of the measurement confirmed that the above powder has a mean particle size of 12 µm.

Further, X-ray diffraction measurement of the above powder was carried out and results of the measurement confirmed that an obtained diffraction pattern is similar to a $LiNiO_2$ pattern defined in 09-0063 of ICDD, and the above powder forms a layer halite structure similar to that of $LiNiO_2$=. Observation of the above powder was further carried out using a scan-type electronic microscope, and results of the observation confirmed particles having a configuration consisting of aggregation of primary grains of 0.1 µm to 41 µm.

Then, 86% of lithium-transition metal composite oxide B thus prepared, 10% of graphite as a conductive material, and 4% of PVdF as a binder were mixed and further dispersed into NMP to obtain a compound material in a slurry form. The slurry-formed compound material was uniformly coated on a long strip-shaped aluminum foil of 20 µm thick, dried, compressed using a roller press machine, and punched out in a predetermined size to thereby obtain a pellet. Thus-fabricated pellet was used as a cathode, while a lithium foil was used as an anode, and these electrodes were stacked while placing a known porous polyolefin film in between to manufacture a coin cell having a diameter of 20 mm and a height of 16 mm. For the electrolyte solution, a non-aqueous electrolyte solution was prepared by dissolving $LiPF_6$ in a solution obtained by mixing ethylene carbonate and methyl ethyl carbonate in a volume mixing ratio of 1:1 so as to adjust the concentration thereof to 1 $mol/dm^3$.

Thus-fabricated coin cell was charged up to 4.250 V, then discharged under a current of 0.2 C down to 3.000 V, and resulted in a mean discharge voltage of 3.827 V.

(3) Preparation of Cathode Active Material

Thus-prepared lithium-transition metal composite oxide A and thus-prepared lithium-transition metal composite oxide B were mixed so that a molar ratio thereof becomes 90:10 to thereby prepare a cathode active material.

(4) Manufacture of Cylindrical Battery

86% of cathode active material described above, 10% of graphite as a conductive material and 4% of PVdF as a binder were mixed and further dispersed into NMP to obtain a cathode compound material in a slurry form. The slurry-formed compound material was uniformly coated on the opposite faces of a long strip-shaped aluminum foil of 2 µm thick, dried, and compressed using a roll press machine to thereby obtain a long strip-shaped cathode.

Next, for an anode, to 90% of artificial graphite in a powdered form was added 10% of PVdF and further dispersed into NMP to obtain an anode compound material in a slurry form. The slurry-formed anode compound material was uniformly coated on the opposite faces of a copper foil of 10 µm thick, and compressed using a roll press machine to thereby obtain a long strip-shaped anode.

Thus-fabricated strip-shaped cathode and long strip-shaped anode were spirally wound up a large number of times while placing a porous polyolefin film in between to fabricate a spirally wound electrode member. Thus-fabricated electrode member was enclosed in a battery container made of nickel-plated iron, and insulator plates were mounted to both upper and lower faces of the electrode member.

Next, a cathode lead made of aluminum was extracted from a cathode current collector and welded to a projection part of a safety valve whose electrical conduction to the battery cap has been ensured, and an anode lead made of nickel was extracted from an anode current collector and welded to a bottom of the battery container.

Meanwhile, for the electrolyte solution, a non-aqueous electrolyte solution was prepared by dissolving $LiPF_6$ in a solution obtained by mixing ethylene carbonate and methyl ethyl carbonate in a volume mixing ratio of 1:1 so as to adjust the concentration thereof to 1 $mol/dm^3$.

Then, the above electrolyte solution was poured into the battery container with the above electrode member incorporated therein, and the safety valve, the PTC element and the battery cap were fixed by caulking the battery container while placing an insulator sealing gasket in between to thereby manufacture a non-aqueous electrolyte secondary battery having a shape of cylinder with an outer diameter of 18 mm and a height of 65 mm.

Example 45

$LiNi_{0.35}Co_{0.25}Mn_{0.4}O_2$ was prepared under conditions that a mixing ratio of materials in Example 44 was altered in preparation of the lithium-transition metal composite oxide B, and measurement of a mean discharge voltage was carried out similarly and resulted in 3.895 V.

Then, thus-prepared lithium-transition metal composite oxide B and the lithium-transition metal composite oxide A prepared in Example 44 were mixed similarly to prepare a cathode active material, and thereafter, the non-aqueous electrolyte secondary battery in this Example was manufactured by repeating operations similar to those of Example 44.

Example 46

$LiCu_{0.8}Ni_{0.2}O_2$, was prepared under conditions that part of cobalt oxide as the material in Example 44 was substituted with nickel hydroxide in preparation of the lithium-transition metal composite oxide A, and measurement of a mean discharge voltage was carried out similarly and resulted in 3.911 V.

Then, thus-prepared lithium-transition metal composite oxide A and the lithium-transition metal composite oxide B prepared in Example 44 were mixed similarly to prepare a cathode active material, and the non-aqueous electrolyte secondary battery of this Example was manufactured by repeating operations similar to those of Example 44.

Comparative Example 15

The non-aqueous electrolyte secondary battery of this Example was manufactured by repeating operations similar to those of Example 44 using a cathode active material composed of only the lithium-transition metal composite oxide A prepared in Example 44 without being added with the lithium-transition metal composite oxide B.

Comparative Example 16

The non-aqueous electrolyte secondary battery of this Example was manufactured by repeating operations similar to those of Example 44 using a cathode active material composed of only the lithium-transition metal composite oxide A prepared in Example 46 without being added with the lithium-transition metal composite oxide B.

Comparative Example 17

$LiCoO_2$ and $LiNi_{0.8}Co_{0.1}Mn_{0.1}O_2$ were prepared under conditions that a mixing ratio of materials in Example 44 was altered in preparation of the lithium transition metal composite oxide B, and measurement of a mean discharge voltage was carried out similarly and resulted in 3.919 V.

Then, thus-prepared lithium-transition metal composite oxide B and the lithium-transition metal composite oxide A prepared in Example 44 were mixed similarly to prepare a cathode active material, and the non-aqueous electrolyte secondary battery in this Example was manufactured by repeating operations similar to those of Example 44.

[Evaluation of Over-Discharge Resistance]

Thus-fabricated non-aqueous electrolyte secondary batteries in Examples and Comparative Examples were subjected to measurement of initial discharge capacity on condition that these batteries were charged under a voltage of 4.20 V and a current of 1000 mA in an atmosphere of 23° C. for 2.5 hours, and thereafter discharged under a current of 800 mA down to 2.75 V. Subsequently, constant resistance discharge was carried out for 24 hours as an over-discharge test by connecting a resistance of 2.0Ω so as to be placed between the cathode and the anode. Then, measurement of discharge capacity after the over-discharge test was carried out according to the similar procedure to that used for measurement of the initial discharge capacity, so as to calculate a capacity retention ratio in proportion to the initial discharge capacity. Table 6 shows the evaluation results.

ficient effects, while a difference in mean discharge potential as much as 0.05 V or more is successful in achieving sufficient effects.

Example 47

A cathode active material was prepared under conditions that the lithium-transition metal composite oxide A and the lithium transition metal composite oxide B prepared in Example 44 were mixed in a molar ratio of 98:2, and then, the non-aqueous electrolyte secondary battery in this Example was manufactured by repeating operations similar to those of Example 44.

Example 48

A cathode active material was prepared under conditions that the lithium-transition metal composite oxide A and the lithium-transition metal composite oxide B prepared in Example 44 were mixed in a molar ratio of 96:4, and then, the non-aqueous electrolyte secondary battery of this Example was manufactured by repeating operations similar to those of Example 44.

Example 49

A cathode active material was prepared under conditions that the lithium-transition metal composite oxide A and the lithium-transition metal composite oxide B prepared in Example 44 were mixed in a molar ratio of 70:30, and then, the non-aqueous electrolyte secondary battery in this Example was manufactured by repeating operations similar to those of Example 44.

Example 50

A cathode active material was prepared under conditions that the lithium-transition metal composite oxide A and the lithium-transition metal composite oxide B prepared in Example 44 were mixed in a molar ratio of 50:50, and then, the non-aqueous electrolyte secondary battery in this Example was manufactured by repeating operations similar to those of Example 44.

TABLE 6

| | | Cathode active material | | | Mean discharge voltage (V) | | | Over-discharge resistance | | |
|---|---|---|---|---|---|---|---|---|---|---|
| | | Lithium-transition metal composite oxide A | Lithium-transition metal composite oxide B | Mixing ratio A:B | A | B | Difference between A and B | Initial discharge capacity (mAh) | Capacity after over-discharge (mAh) | Capacity retention ratio (%) |
| Example | 44 | $LiCoO_2$ | $LiNi_{0.6}Co_{0.2}Mn_{0.2}O_2$ | 90:10 | 3.948 | 3.827 | 0.121 | 1890 | 1780 | 94.2 |
| | 45 | $LiCoO_2$ | $LiNi_{0.35}Co_{0.25}Mn_{0.4}O_2$ | 90:10 | 3.948 | 3.895 | 0.053 | 1880 | 1730 | 92 |
| | 46 | $LiCo_{0.8}Ni_{0.2}O_2$ | $LiNi_{0.6}Co_{0.2}Mn_{0.2}O_2$ | 90:10 | 3.911 | 3.827 | 0.084 | 1900 | 1810 | 95.3 |
| Comparative | 15 | $LiCoO_2$ | None | 100:0 | 3.948 | — | | 1860 | 1310 | 70.3 |
| Example | 16 | $LiCo_{0.8}Ni_{0.2}O_2$ | None | 100:0 | 3.911 | — | | 1890 | 1350 | 71.4 |
| | 17 | $LiCoO_2$ | $LiCo_{0.8}Ni_{0.1}Mn_{0.1}O_2$ | 90:10 | 3.948 | 3.919 | 0.029 | 1880 | 1500 | 79.8 |

As judged from the above results, it was confirmed that adding the second lithium-transition metal composite oxide B to the first lithium-transition metal composite oxide A results in improvement of over-discharge characteristics. It was also proved that a small difference in mean discharge voltage between these composite oxides A and B fails to obtain suf- Example 51

A cathode active material was prepared under conditions that the lithium-transition metal composite oxide A and the lithium-transition metal composite oxide B prepared in Example 44 were mixed in a molar ratio of 40:60, and then, the non-aqueous electrolyte secondary battery in this Example was manufactured by repeating operations similar to those of Example 44.

[Evaluation of Over-Discharge Characteristics]

Thus-fabricated non-aqueous electrolyte secondary batteries were subjected to over-discharge test similar to the above. Table 7 shows evaluation results.

TABLE 7

| | Mixing ratio (molar ratio) of first lithium-transition metal composite oxide A to second lithium-transition metal composite oxide B A:B | Over-discharge resistance | | |
|---|---|---|---|---|
| | | Initial discharge capacity (mAh) | Capacity after over-discharge (mAh) | Capacity retention ratio (%) |
| Example 47 | 98:2 | 1890 | 1480 | 78.3 |
| 48 | 96:4 | 1890 | 1750 | 92.6 |
| 49 | 70:30 | 1870 | 1770 | 94.7 |
| 50 | 50:50 | 1850 | 1790 | 96.8 |
| 51 | 40:60 | 1710 | 1660 | 97.1 |

As judged from the results summarized in Table 7, it was confirmed that a mixing ratio of the second lithium-transition metal composite oxide as much as less than 4% results in degradation of over-discharge characteristics, while a mixing ratio thereof as much as more than 50% is susceptible to degradation of initial discharge capacity. It was also confirmed that a preferable mixing ratio of the second lithium-transition metal composite oxide B is in a range of 4% or more and 50% or less.

As has been described in the foregoing, according to the present invention, use of the cathode active material containing the mixture of the first cathode material having a large capacity and the second cathode material exhibiting a stabled crystal structure achieves the non-aqueous electrolyte secondary battery that is successful in raising initial discharge capacity and in increasing an energy density and has excellent charge/discharge cycle capacity retention ratio not only at room temperature but also under high temperature environment.

According to the present invention, the lithium composite oxide, in which variation of nickel ion during charging/discharging when measured using X-ray absorption fine structure analysis (XAFS) falls in a predetermined range, is used, so that it is possible to provide the cathode active material that may realize a lithium ion non-aqueous electrolyte secondary battery having a large capacity and largely improved characteristics under high temperature environment (in a range from a room temperature to 100° C. or around) and also to provide the lithium ion non-aqueous electrolyte secondary battery using this cathode active material.

Furthermore, according to the present invention, the first lithium-transition metal composite oxide mainly containing lithium and cobalt and the second lithium-transition metal composite oxide whose mean discharge voltage is lower than that of the above composite oxide by 0.05 V or more are contained, so that it is possible to provide the cathode active material that may realize the lithium ion non-aqueous electrolyte secondary battery having a large capacity and being excellent in over-discharge resistance, and also to provide the lithium ion non-aqueous electrolyte secondary battery using this cathode active material.

The invention claimed is:

1. A cathode active material comprising:
a mixture of a first cathode material and a second cathode material,
wherein said first cathode material is $Li_xNi_{1-y-z}Co_yM_zO_2$ with "x" being $0.9 \leq x \leq 1.10$, "y" being $0.05 \leq y \leq 0.50$, "z" being $0.01 \leq z \leq 0.10$, and M being one or more elements from the group consisting of Fe, Zn, Al, Sn, Cr, V, Ti, Mg and Ga,
wherein said second cathode material is $Li_sNi_{1-t-u}Mn_tM'_uO_2$ with "s" being $0.9 \leq s \leq 1.10$, "t" being $0.05 \leq t \leq 0.50$, "u" being $0.01 \leq u \leq 0.30$, and M' being one or more elements from the group consisting of Fe, Zn, Al, Sn, Cr, V, Ti, Mg and Ga,
wherein said mixture is 15% by weight or more of said first cathode material to 85% by weight or less of said second cathode material.

2. A cathode active material comprising:
a mixture of a first cathode material and a second cathode material,
wherein said first cathode material is $Li_xNi_{1-y-z}Co_yM_zO_2$ with "x" being $0.9 \leq x \leq 1.10$, "y" being $0.05 \leq y \leq 0.50$, "z" being $0.01 \leq z \leq 0.10$, and M being one or more elements from the group consisting of Fe, Zn, Sn, Cr, V, Ti, Mg and Ga,
wherein said second cathode material is $Li_sNi_{1-t-u}Mn_tM'_uO_2$ with "s" being $0.9 \leq s \leq 1.10$, "t" being $0.05 \leq t \leq 0.50$, "u" being $0.01 \leq u \leq 0.30$, and M' being one or more elements from the group consisting of Fe, Zn, Al, Sn, Cr, V, Ti, Mg and Ga,
wherein said mixture is 15% by weight or more of said second cathode material to 85% by weight or less of said first cathode material.

3. A cathode active material comprising:
a mixture of a first cathode material and a second cathode material,
wherein said first cathode material is $Li_xNi_{1-y-z}Co_yM_zO_2$ with "x" being $0.9 \leq x \leq 1.10$, "y" being $0.05 \leq y \leq 0.50$, "z" being $0.01 \leq z \leq 0.10$, and M being one or more elements from the group consisting of Fe, Zn, Al, Sn, Cr, V, Ti, Mg and Ga,
wherein said second cathode material is $Li_sNi_{1-t-u}Mn_tM'_uO_2$ with "s" being $0.9 \leq s \leq 1.10$, "t" being $0.05 \leq t \leq 0.50$, "u" being $0.01 \leq u \leq 0.30$, and M' being one or more elements from the group consisting of Fe, Zn, Al, Sn, Cr, V, Ti, Mg and Ga,
wherein a mean particle size of each of said first cathode material and said second cathode material is 2 μm to 30 μm.

4. A cathode active material comprising:
a mixture of a first cathode material and a second cathode material,
wherein said first cathode material is $Li_xNi_{1-y-z}Co_yM_zO_2$ with "x" being $0.9 \leq x \leq 1.10$, "y" being $0.05 \leq y \leq 0.50$, "z" being $0.01 \leq z \leq 0.10$, and M being one or more elements from the group consisting of Fe, Zn, Al, Sn, Cr, V, Ti, Mg and Ga,
wherein said second cathode material is $Li_sNi_{1-t-u}Mn_tM'_uO_2$ with "s" being $0.9 \leq s \leq 1.10$, "t" being $0.05 \leq t \leq 0.50$, "u" being $0.01 \leq u \leq 0.30$, and M' being one or more elements from the group consisting of Fe, Zn, Al, Sn, Cr, V, Ti, Mg and Ga,
wherein Co parts in said first cathode material and Mn parts in said second cathode material are in a range of 0.05 or more to 0.50 or less.

* * * * *